United States Patent
Yadavalli

(10) Patent No.: US 11,740,903 B2
(45) Date of Patent: Aug. 29, 2023

(54) COMPUTING MACHINE USING A MATRIX SPACE AND MATRIX POINTER REGISTERS FOR MATRIX AND ARRAY PROCESSING

(71) Applicant: Onnivation, LLC, San Jose, CA (US)

(72) Inventor: Sitaram Yadavalli, San Jose, CA (US)

(*) Notice: Subject to any disclaimer, the term of this patent is extended or adjusted under 35 U.S.C. 154(b) by 171 days.

(21) Appl. No.: 16/396,680

(22) Filed: Apr. 27, 2019

(65) Prior Publication Data

US 2019/0250915 A1 Aug. 15, 2019

Related U.S. Application Data

(63) Continuation-in-part of application No. 15/488,494, filed on Apr. 16, 2017, now abandoned.

(60) Provisional application No. 62/327,949, filed on Apr. 26, 2016.

(51) Int. Cl.
*G06F 9/30* (2018.01)
*G06F 9/345* (2018.01)
*G06F 9/34* (2018.01)

(52) U.S. Cl.
CPC ........ *G06F 9/30101* (2013.01); *G06F 9/3001* (2013.01); *G06F 9/30007* (2013.01); *G06F 9/30032* (2013.01); *G06F 9/30036* (2013.01); *G06F 9/30043* (2013.01); *G06F 9/30149* (2013.01); *G06F 9/30167* (2013.01); *G06F 9/30185* (2013.01); *G06F 9/34* (2013.01); *G06F 9/345* (2013.01)

(58) Field of Classification Search
CPC ............. G06F 9/30003; G06F 9/30007; G06F 9/30036; G06F 9/30043; G06F 9/30101; G06F 9/30105; G06F 9/30185; G06F 9/34; G06F 9/345; G06F 9/35; G06F 12/0207; G06F 17/16
See application file for complete search history.

(56) References Cited

U.S. PATENT DOCUMENTS

| | | |
|---|---|---|
| 4,896,294 A | 1/1990 | Shimizu |
| 5,040,150 A | 8/1991 | Naitoh |
| 7,554,355 B2 | 6/2009 | Chang |

(Continued)

OTHER PUBLICATIONS

MathWorks.com, MATLAB R2014b Documentation, Feb. 2015, 4 pages.*

*Primary Examiner* — David J. Huisman
(74) *Attorney, Agent, or Firm* — Lincoln Law School of San Jose

(57) ABSTRACT

This disclosure relates to methods and mechanisms for matrix computing which include machine embodiments with one or more matrix storage spaces for holding matrices and arrays for computing, where a matrix or an array is accessible by its columns, by its rows, or both, individually, or concurrently. A set of methods and mechanisms to build a large capacity instruction set with multi-length instructions to load, store, and compute with these matrices and arrays are also disclosed. Methods and access control mechanisms with keys to secure, share, lock and unlock regions in the storage space for matrices and arrays under the control of an operating system or a virtual machine hypervisor by permitted threads and processes are also disclosed. Methods and mechanisms to handle long immediate operands for use by shorter instructions using a payload instruction are also disclosed. The structure of the instructions with key instruction fields and a method for determining instruction length are also disclosed.

14 Claims, 17 Drawing Sheets

(56) References Cited

U.S. PATENT DOCUMENTS

| | | | |
|---|---|---|---|
| 7,768,531 B2* | 8/2010 | Ollmann | G06T 3/606 |
| | | | 345/619 |
| 8,924,654 B1 | 12/2014 | Graziano | |
| 10,649,772 B2* | 5/2020 | Bradford | G06F 9/30109 |
| 11,237,828 B2* | 2/2022 | Yadavalli | G11C 11/4094 |
| 2002/0032710 A1* | 3/2002 | Saulsbury | G06F 9/30109 |
| | | | 708/400 |
| 2002/0097623 A1 | 7/2002 | Suzuki | |
| 2004/0151047 A1 | 8/2004 | Bartling | |
| 2005/0055534 A1* | 3/2005 | Moyer | G06F 9/30043 |
| | | | 712/4 |
| 2006/0101245 A1* | 5/2006 | Nair | G06F 9/30036 |
| | | | 712/221 |
| 2010/0180100 A1* | 7/2010 | Lu | G06F 12/0862 |
| | | | 712/22 |
| 2014/0321198 A1 | 10/2014 | Naji | |
| 2014/0344515 A1* | 11/2014 | Wang | G11C 11/40615 |
| | | | 711/110 |
| 2017/0278555 A1 | 9/2017 | Su | |
| 2019/0043553 A1 | 2/2019 | Chang | |
| 2019/0221262 A1 | 7/2019 | Ma | |

* cited by examiner

16-bit length Instructions

250 ⸺ Imm8; Opcode_0; ISA; Op Modifiers; Len.
Y; X; Opcode_0; ISA; Op Modifiers; Len.
Imm4; X; Opcode_0; ISA; Op Modifiers; Len.
Opcode_1; X; Opcode_0; ISA; Op Modifiers; Len.
Opcode_1; Opcode_2; Opcode_0; ISA; Op modifiers; Len.
⸺Imm8; Opcode_0; Imm3; Len.
251⸺

32-bit length Instructions

252 ⸺ Imm24; Opcode_0; ISA; CoP; Op Modifier; Len.

Imm; X; Opcode_0; ISA; CoP; Op Modifier; Len.
Imm; Y; X; Opcode_0; ISA; CoP; Op Modifier; Len.
Imm; Opcode_1; X; Opcode_0; ISA; CoP; Op Modifier; Len.

Imm4; Z; Y; Opcode_2; Opcode_1; X; Opcode_0; ISA; CoP; Op Modifier; Len.
Opcode_3; Z; Y; Opcode_2; Opcode_1; X; Opcode_0; ISA; CoP; Op Modifier; Len.
Field_4; Field_4; Field_4; Opcode_2; Opcode_1; X; Opcode_0; ISA; CoP; Op Modifier; Len.
Field_6; Field_6; Opcode_2; Opcode_1; X; Opcode_0; ISA; CoP; Op Modifier; Len.
Field_6; Field_2; Field_4; Opcode_2; Opcode_1; X; Opcode_0; ISA; CoP; Op Modifier; Len.

254

48- and 64-bit length Instructions

253 ⸺ Imm56; Opcode_0; CoP; ISA; Op Modifier; Len.

Field_N ... Field_N ... Field_N; Opcode_2; Opcode_1; X; Opcode_0; CoP; ISA; Op Modifier; Len.

255

Where
Len = Instruction Length Identifier.
CoP = CoProcessor Instruction Identifier.
ISA = ISA Classifier.
Destination = Address of a Register / a Memory Location/ a Port / pointer to an Array or Matrix Location / a Location where a Result of computation is written.
X = Principal destination operand (& Source Operand where applicable).
Y = A source operand ( & a Destination where applicable).
Z = a source operand /an Immediate operand ( & a Destination where applicable).
ImmN = Immediate Operand of N bits.
Op Modifier = a field that modifies the Opcode.
Field_N = N-bit Field.
where N is 2-, 4-, 6-, 8-,10-, 12- or 16-bits.

FIG. 2B

MATRIX & MATRIX

Operation, matrix, matrix;

Operation, matrix, matrix, matrix;

Operation, matrix, matrix, row, col;

Operation, matrix, number, number, number;

Operation, scalar, matrix, matrix, number;

Operation, matrix, matrix, number, number;

Operation, matrix, matrix, vector, number;

SCALAR & MATRIX

Operation, scalar, matrix

Operation, matrix, row, scalar

Operation, matrix, col, scalar

Operation, matrix, row, col, scalar, number

Operation, matrix, scalar, scalar, number, number

Operation, matrix, row, col, scalar

VECTOR & MATRIX

Operation, vector, matrix, number;

Operation, matrix, row, vector, number;

Operation, matrix, col, vector, number;

Operation, matrix, row, col, vector, number;

Operation, matrix, number, number, number;

Operation, matrix, vector, number, number, number;

Operation, matrix, row, vector, vector, number;

Operation, matrix, col, vector, vector, number;

NOTES:

matrix: denotes a label to address a matrix pointer register whose contents control a matrix in matrix space.

vector: denotes a label to address a vector register.

scalar: denotes a label to address a scalar register.

Operation: denotes a matrix or array operation row: denotes number of a row in a matrix or number of rows to affect.

col: denotes number of a column in a matrix or number of columns to affect.

number: denotes a value which may be a scalar, an immediate operand, or a parameter such as a type, a count or a code that affects the use of that instruction

FIG. 4

// An example of a Program sequence to multiply two matrices in one embodiment of the invention m[303] = MOVIMM MX_A ;   // Move Immediate into MXPTR [303] the value MX_A to point to space [310] in Matrix Space [301].

m[304] = MOVIMM MX_D;    // Move Immediate into MXPTR [304] the value MX_D to point to space [311] in Matrix Space [301].

m[305] = MOVIMM MX_C;    // Move Immediate into MXPTR [305] the value MX_C to point to space [312] in Matrix Space [301]

@m[303] = LOADMX Memory[ regA ];   // LOAD matrix into space [310] pointed by m [303] from main Memory location pointed by regA.

@m[304] = LOADMX Memory[ regD ];   // LOAD matrix into space [311] pointed by m [304] from main Memory location pointed by regD.

551
@m[305] = @m[303] * @m[304];       // Multiply Matrix A at [310] with Matrix D at [311] and put result in Matrix C at [312].

Memory[ regC ] = STOREMX @m[305];  // Store the matrix C from [312] into system memory at location pointed by regC.

FIG. 5

PRIOR ART

| MOVI | Dest | Immediate16 |

MOVI Destination, Immediate16

An example of a Move Immediate instruction in Prior Art

| ADDI | Dest | Src0 | Immediate12 |

ADDI Destination, Source0, Immediate16

FIG. 10

```
// Can Load 15 bits into a Reg

PAYLOAD Immediate11;            ~1251        // 16-bit Payload Instruction

MOVI RegisterX, Immediate4;
                      \—1252
```
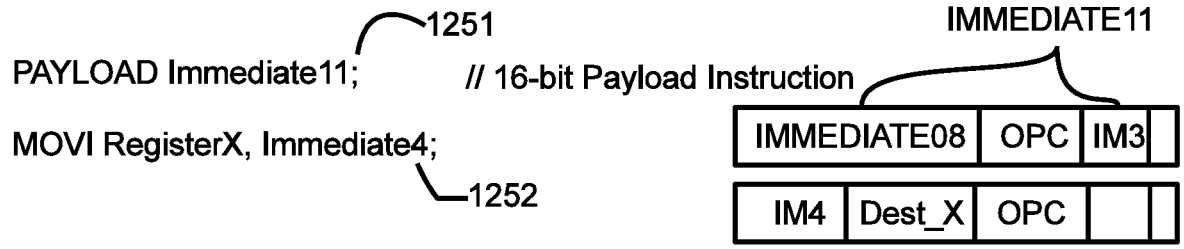

```
// Executes as: RegisterX = Immediate4.Immediate11; where '.' is a concatenation.
// where Dest_X is RegisterX
```

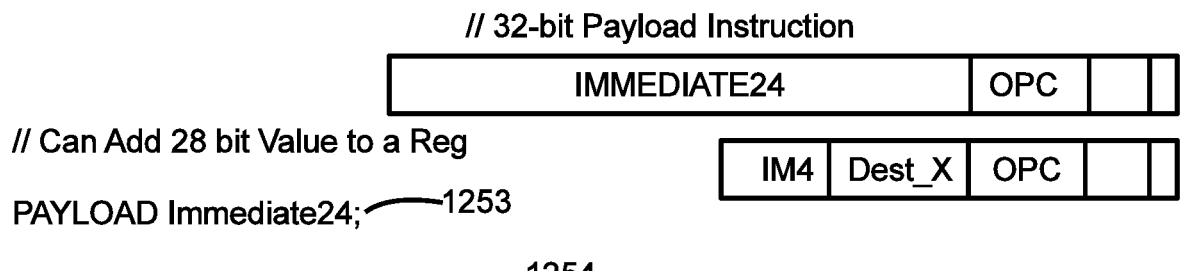

```
// Can Add 28 bit Value to a Reg

PAYLOAD Immediate24;  ~1253

ADDI RegisterX, Immediate4; ~1254

// Executes as: RegisterX = RegisterX + (Immediate4.Immediate24);
// where '.' denotes a concatenation.
```

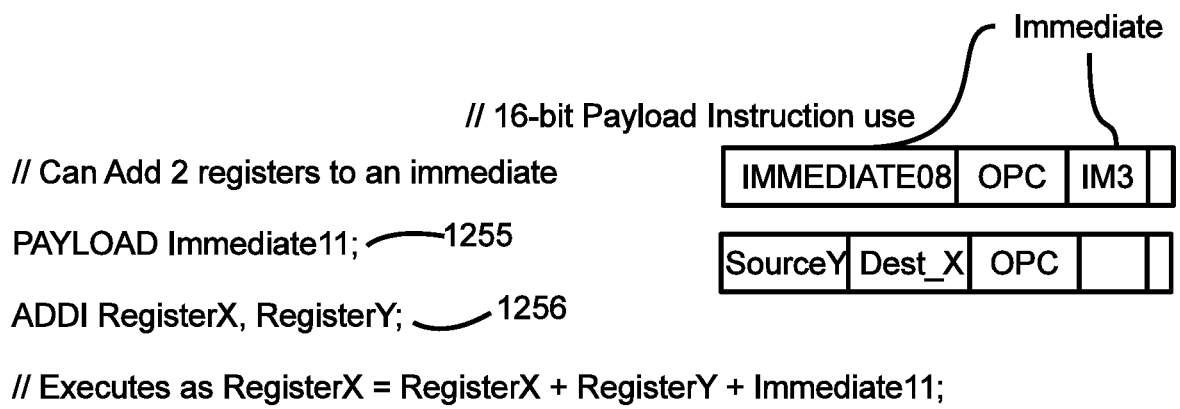

```
// Can Add 2 registers to an immediate

PAYLOAD Immediate11; ~1255

ADDI RegisterX, RegisterY; ~1256

// Executes as RegisterX = RegisterX + RegisterY + Immediate11;
```

FIG. 12

COMPUTING MACHINE USING A MATRIX SPACE AND MATRIX POINTER REGISTERS FOR MATRIX AND ARRAY PROCESSING

CROSS-REFERENCE TO RELATED DOCUMENTS

The present application is a Continuation in Part of U.S. Non-Provisional patent application Ser. No. 15/488,494 (titled "A COMPUTING MACHINE ARCHITECTURE FOR MATRIX AND ARRAY PROCESSING" and filed on Apr. 16, 2017), which claimed priority to U.S. Provisional Application Serial No. U.S. 62/327,949 (titled "A COMPUTING MACHINE ARCHITECTURE FOR MATRIX AND ARRAY PROCESSING" and filed on Apr. 26, 2016; both applications are incorporated herein by reference.

BACKGROUND

The prior art Reduced Instruction Set (RISC) Architectures have used fixed word length sizes for computing. With fixed word length the number of instructions in RISC architectures cannot grow over generations beyond a limit. They have been upgraded for SIMD computing with vector registers and vector computing units. In contrast, the so called Complex Instruction Set (CISC) Architectures for computing have utilized variable word length instructions. Their complexity often derives from the difficulty in determining the word length and the use of memory operands in a large number of instructions including those that use the Arithmetic Logic Units (ALUs) and other computational units. Many of these have been upgraded to perform SIMD computation with vector registers. Each has several disadvantages associated with their complexity or extensibility which may include higher power consumption, or lower performance in some cases.

The prior art may incorporate various embodiments of a register file comprising vectors of scalar values. In some prior art, each register of a file held one vector and a mask determined the valid values of the vector. In some prior art, a vector was simply a register in a SIMD register file. In both cases, instructions using these vectors may simply read one to three vector values from the corresponding registers, wherein the vector values may be computed by adding, subtracting or performing a simple arithmetic or logical operation between the vectors. The prior art may not implicitly recognize the data stored in the registers as a matrix or a plurality of matrices and hence may not determine matrix properties like rank, triangularity and such, using an easy and direct method without using many instructions.

In prior art, Matrix computations may be done by a Central Processing Unit using vector registers and SIMD instructions. All matrices are to be stored, loaded and processed as 1-dimensional vectors in prior art. In some cases, special purpose units called systolic arrays may be used to process matrices. A systolic array may be a grid-like structure of special processing elements that may process data much like an n-dimensional pipeline. Unlike a pipeline, the input data as well as partial results may flow through the array. Systolic arrays use a matrix of computational units (multiply accumulators) with local storage to hold the operands of computation.

SUMMARY

This disclosure presents methods and mechanisms for matrix computing and array processing. It also discloses an extensible computer-implemented instruction set with a capacity for a large number of instructions that allows for computing with arrays and matrices. The matrices and arrays may be held in a storage space called a Matrix Space and accessed by rows, or columns, or both, individually or concurrently, with the help of matrix pointer registers, for computing. It also discloses a set of machine instructions and methods to load, store and compute with these matrices, and methods and mechanisms to secure, share, lock and unlock regions in a Matrix Space under the control of an operating system or a virtual machine monitor. Also disclosed in here are methods and mechanisms for immediate mode addressing of immediate operands using 'payload' instructions. Use of the payload instructions allows more bits to be available for definition and decoding of a larger number of instructions and hence grow the instruction set size significantly with newer instructions over many generations.

A system of one or more computers may be configured to perform particular operations or actions by virtue of having software, firmware, hardware, or a combination of them installed on the system that in operation may cause the system to perform the actions. One or more computer programs may be configured to perform particular operations or actions by virtue of including instructions that, when executed by data processing apparatus, may cause the apparatus to perform the actions. In some aspects, corresponding computer systems, apparatus, and computer programs recorded on one or more computer storage devices, may be configured to perform the actions of the methods. The present disclosure relates to a computer-implemented instruction set comprising: one or more matrix instructions that perform operations on one or more matrices and arrays, wherein a reading and decoding of the one or more matrix instructions allows for decoding and using an index of a matrix pointer register.

Implementations may comprise one or more of the following features. The computer-implemented instruction set wherein a reading and decoding of the one or more matrix instructions allows for writing and reading contents of a matrix pointer register which comprise a matrix allocation location. The computer-implemented instruction set wherein obtaining contents of the matrix pointer register allows for access to the one or more matrices and arrays. The computer-implemented instruction set wherein the one or more matrices and arrays accessed using a matrix pointer register reside in a matrix space. The computer-implemented instruction set may further comprise: one or more load matrix instructions; and one or more store matrix instructions. The computer-implemented instruction set may further comprise vector instructions configured to operate upon one or more of vector entities, wherein the vector entities comprise one or more scalars or packed and ordered groups of values. The computer-implemented instruction set may further comprise matrix instructions configured to operate upon one or more of matrices and arrays, and one or more vector entities. The computer-implemented instruction set wherein the matrix instructions comprise a plurality of highly structured multi-length instructions, and wherein each of the highly structured multi-length instructions comprises a multiple of 16 bits. The computer-implemented instruction set wherein the instruction set may comprise highly structured multi-length instructions. Implementations of the described techniques may comprise hardware, a method or process, or computer software on a computer-accessible medium.

In some aspects, corresponding computer systems, apparatus, and computer programs recorded on one or more computer storage devices, may be configured to perform the actions of the methods. The present disclosure relates to a matrix space comprising: an embedded storage configured to hold matrices and/or multidimensional arrays and/or vectors of values for computation whose elements are accessible by at least one of rows and columns; a set of matrix pointer registers configured to hold location, size and type information of matrices and arrays; and a set of machine instructions configured to execute one or more algorithms or programs.

Implementations may comprise one or more of the following features. The matrix space wherein the values comprise one or more numeric values, non-numeric values, or packed and ordered groups of scalars. The matrix space wherein the set of matrix pointer registers are configured to access the matrices or multidimensional arrays and vectors. The matrix space wherein the matrix space may comprise a random access memory that can be accessed by rows and columns, or both. The matrix space wherein the rows and columns are accessible in two dimensions. The matrix space wherein the matrix space is on a single semiconductor chip. The matrix space wherein the matrix space is on a plurality of semiconductor chips. The matrix space wherein the rows and columns are accessible concurrently. The matrix space wherein a member of the set of matrix pointer registers is configured to store a pair of numbers designating row and column addresses of an origin of the matrix. Implementations of the described techniques may comprise hardware, a method or process, or computer software on a computer-accessible medium.

In some aspects, corresponding computer systems, apparatus, and computer programs recorded on one or more computer storage devices, may be configured to perform the actions of the methods. The present disclosure relates to a method of executing one or more matrix instructions comprising the method steps of: decoding one or more opcode fields in the matrix instruction to determine functionality and operations to perform; decoding operands to determine at least one or more source and/or one or more destination matrix pointer registers; reading contents of at least one or more source and/or one or more destination matrix pointer registers; using the read contents in computing locations of one or more origins of one or more arrays; using the read contents in computing sizes and extents of the one or more arrays; using the read contents in computing types of values in the one or more arrays; reading out the one or more arrays by at least one of rows and columns to ports of a matrix space; using values in the one or more arrays in performing a computation; and writing computed results into one or more of scalar registers, vector registers, or by at least one of rows and columns into one or more destination arrays in a matrix space.

Implementations may comprise one or more of the following features. The method may further comprise the method step of computing an effective address of a memory location, wherein the effective address is configured to load data from a memory in a load matrix instruction. The method may further comprise the method step of computing an effective address of a memory location, wherein the effective address is configured to store data into a memory in a store matrix instruction. Implementations of the described techniques may comprise hardware, a method or process, or computer software on a computer-accessible medium.

BRIEF DESCRIPTION OF THE DRAWINGS

FIG. 2B illustrates instruction types in a computer-implemented instruction set in some machine embodiments.

FIG. 4 illustrates some exemplary matrix instruction formats used in some embodiments.

FIG. 5 illustrates an exemplary program sequence that may compute with matrices in some embodiments.

FIG. 10 illustrates some examples of immediate mode instructions as used in prior art.

FIG. 12 illustrates some embodiments wherein assembly instruction sequences comprising payload instructions are used in conjunction with some instructions taking immediate operands.

DETAILED DESCRIPTION OF THE INVENTION

The present disclosure relates to a computer-implemented instruction set (henceforth also "instruction set" or "instruction set architecture") comprising highly-structured instructions (henceforth "instructions" or "machine instructions") and a machine implementation that uses such instructions to compute with matrices (also matrixes), arrays and vectors. A matrix or an array may both henceforth be referred to as a "matrix" or "array" (matrices or arrays in plurality) interchangeably without distinction in this disclosure except when distinguished. More specifically, the highly-structured instructions are designed to have their instruction lengths comprise exact multiples of 16 bits. To allow for a large number of instructions and a highly extensible computer-implemented instruction set the disclosure also introduces a payload instruction in conjunction with methods to handle immediate operands. This mechanism allows a large number of instructions to be used in an implementation. As used herein, a 16-bit instruction refers to a machine instruction comprising 16 bits and a 32-bit instruction refers to a machine instruction comprising 32-bits. In some aspects, the term 16-bit instruction or 32-bit instruction do not imply a size of the addressable memory space, the default sizes of the operands, nor data width used in an instruction.

As used herein, a type of element comprises a category of element, in contrast to determining a value of a number or letter. Identifying types of elements may allow for the processing of complex strings comprising combinations of letters, segments, and numbers. Identifying types may allow for separate processing of like types. As non-limiting illustrative examples, a type may comprise a Byte, Short integer, Integer Word, Long integer, Pointer (to a memory location), Ordered Pair of binary values, Ordered Quad of 4 binary values, Triad of 3 binary values, Half precision floating point values, Single precision floating point values, Double Precision floating point values, Extended Precision floating point values, Ordered Pair of floating point values, Ordered Quad of 4 floating point values, collections of Nibbles, bits, di-bits (2-bit values), and so on.

Figure 1:
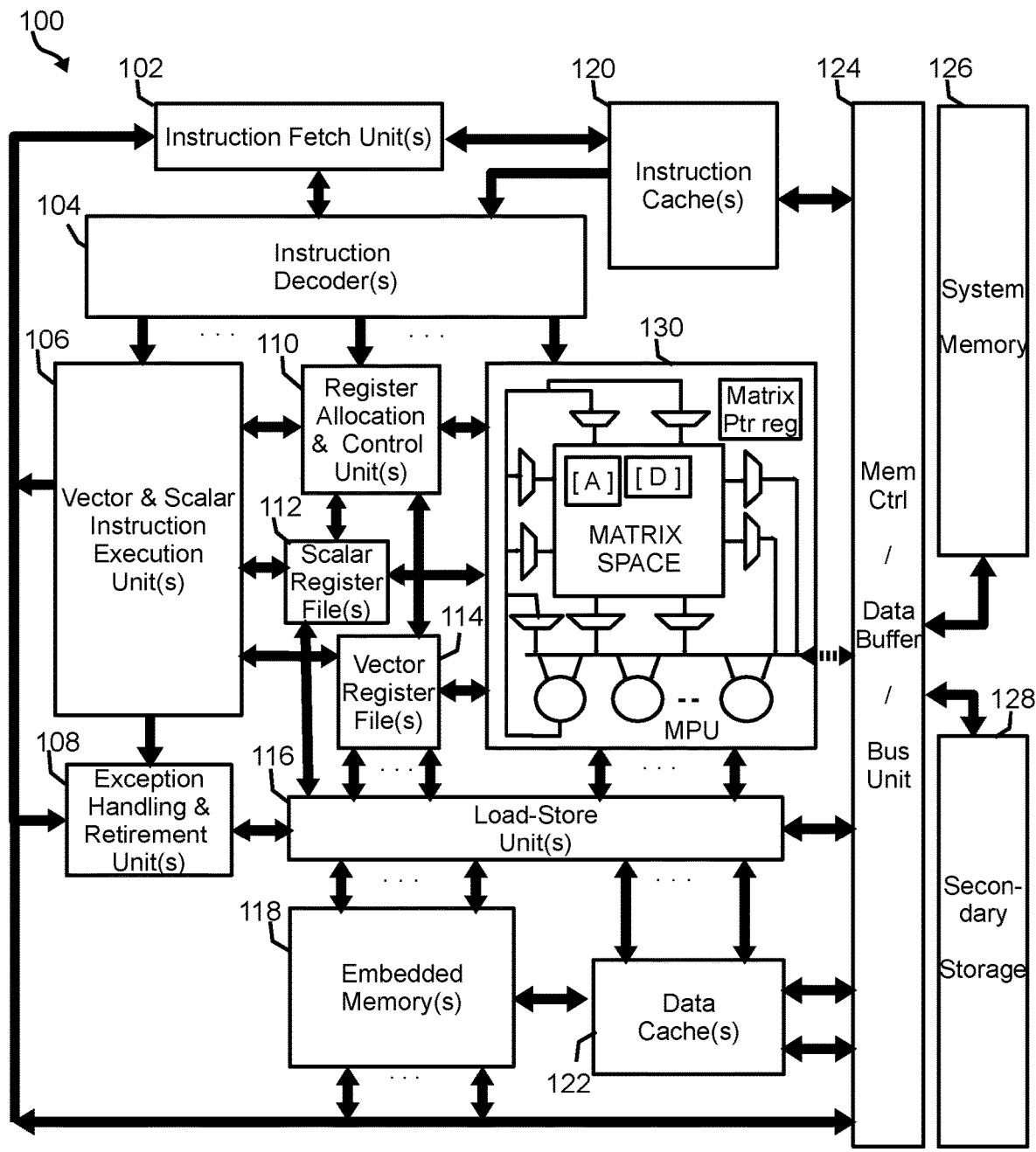
FIG. 1 illustrates one embodiment of a computing machine using a Matrix Space.

FIG. 1 shows one preferred embodiment of a computing machine 100 for matrix and array processing. The computing machine 100 comprises one or more instruction fetch unit(s) 102 to fetch and sequence instructions from the instruction cache 120 and/or a main memory that may comprise a system memory 126 and/or an embedded Memory 118. The computing machine 100 also comprises one or more instruction decoder(s) 104. In some embodiments the instruction decoder(s) 104 comprises the logic for a computer-implemented instruction set for matrix and array computing. The computing machine further comprises one or more vector and scalar instruction execution unit(s) 106, one or more register allocation unit(s) 110, and one or more matrix processing units (MPU(s)) 130 coupled to the instruction decoder(s) 104. In some embodiments one or more machine instructions of the computer-implemented instruction set are presented by the instruction fetch unit(s) 102 to the instruction decoder(s) 104 that decode/interpret the machine instructions using the logic for the computer implemented instruction set and present them to the vector and scalar instruction execution unit(s) 106, and/or the register allocation and control unit(s) 110, and/or the MPU (s) 130. The computing machine 100 further comprises one or more scalar register file(s) 112 and one or more vector register file(s) 114. In some embodiments the scalar register file(s) comprise general purpose and/or integer register file(s), and/or fixed point register file(s), and or pointer register file(s), and/or floating-point register file(s), and or application register file(s), and or control and status register file(s) and/or any other special register file(s) needed by the machine embodiment, and are not limited to these. In some embodiments the vector register file(s) 114 comprise integer or floating point vector register file(s) and/or integer and/or floating point vector register(s). In some embodiments the register allocation and control unit(s) 110 configures and controls selection and access for reading, writing, presetting, and/or clearing data in the scalar and vector register files 112 and 114. In some embodiments the data is provided to and/or received from the vector and scalar instruction execution unit(s) 106 which comprise execution logic implementing various arithmetic, logic, comparison, transport, bit-manipulation, word-manipulation, string manipulation, vector manipulation and other operators. In some embodiments the computing machine 100 further comprises one or more exception handling and retirement unit(s) 108 to handle interrupts, fault, traps, aborts, or any other forms of exceptions of any kind that may occur during program execution and to retire machine instructions of a program in an orderly fashion. Some embodiments of computing machine 100 further comprises data cache(s) 122 coupled to, and controlled and configured by one or more memory controller(s) 124 and one or more load-store unit(s) 116. The memory controller(s) 124 also controls and configures the main memory (comprising embedded memory(s) 118, the system memory 126 and any other memory not limited to graphics memory, display memory and others). The load-store unit(s) 116 may take commands from the vector and scalar execution unit(s) 106 and/or memory controller(s) 124 and/or the MPU(s) 130 to store and/or load data to and from, the data cache(s) 122, the embedded memory(s) 118, system memory (s) 126, and/or any of the main memory(s). In some embodiments the memory controller(s) 124 may further comprise one or more data buffers along with control logic, a system interface and/or a system bus logic also. In some embodiments one or more secondary storage entities 128 of any kind may be coupled to the control logic and/or the system interface in the memory controller(s) 124. In some embodiments the one or more MPU(s) 130 may each comprise one or more Matrix Space(s), one or more matrix pointer register (s), one or more ports coupled to the Matrix Space(s), one or more execution units/matrix & array execution units, control logic to configure and control matrix operations, and data path to transport data within and outside the MPU(s) as shown in FIG. 1. In some embodiments the MPU(s) are not controlled by the memory controller(s) 124 but may send data and receive data to and from the data buffers in the memory controller(s) 124. In some other embodiments the MPU(s) may be loosely controlled by the memory controller (s) 124 for the purpose of exchanging data.

Figure 2A:
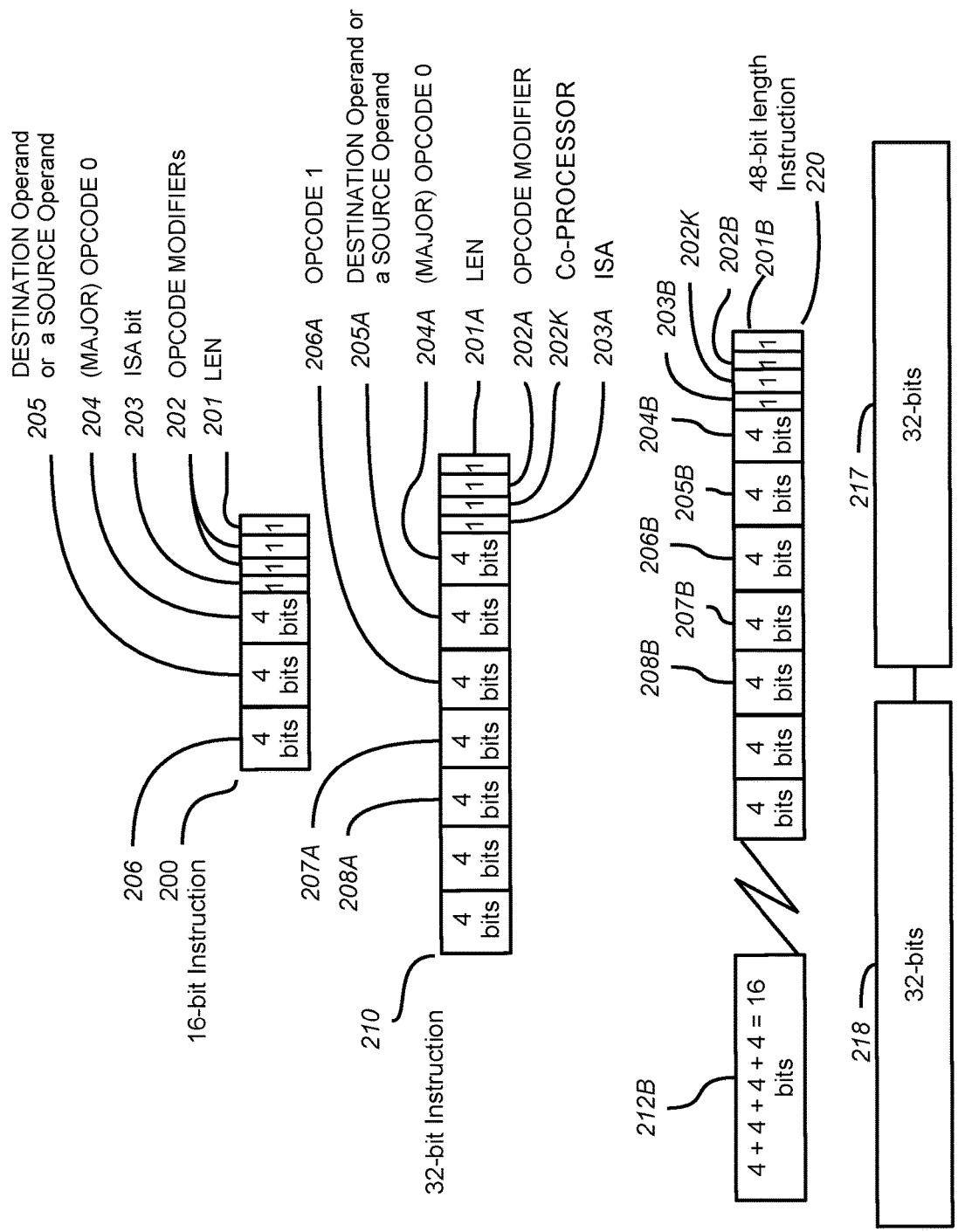
FIG. 2A illustrates the structure of some machine instruction types implemented in some machine embodiments.

Referring now to FIG. 2A, the illustration shows some embodiments of the structure of instructions in a computer-implemented instruction set with different sized instruction types (also referred to as "instructions" in this context) in some machine embodiments. In some aspects, the machine architecture may comprise highly structured instructions of 16-bits 200, 32-bits 210, 48-bits (212B, 220), and/or 64-bits (217, 218 together). As shown in FIG. 2A, in some embodiments, instructions such as 200, 210 or 220 may comprise 1-bit, 2-bit and/or 4-bit fields. In some embodiments, instructions such as 210 may comprise 1-bit and 4-bit fields. In some embodiments, instructions such as 200, 210 or 220 may comprise a 4-bit field such as 204, 204A or 204B, respectively, which may provide a primary or major opcode. The instructions may further comprise a 4-bit field 205, 205A or 205B which may provide a primary or major operand that may be a first destination operand, and may also be a first source operand. In some embodiments, the instructions may further comprise a 1-bit or 2-bit LEN field 201, 201A or 201B, as the case may be, which may be used to determine instruction length. The LEN ("Len" in some places) field 201, 201A or 201B may differentiate 16-bit instructions from instructions of longer length. This may simplify instruction length determination by an instruction decoder. In some embodiments, a field 202, 202A or 202B called an Opcode Modifier field (OPM) may modify the operation of the instruction. In some embodiments, an instruction 200, 210 or 220 comprises a 1-bit or 2-bit ISA field 203, 203A or 203B may partition the instruction set into two or more sub-sets, which may allow for the creation of less comprehensive embodiments of the machine, based on user preference—dues to budget limitations. In some embodiments a 1-bit ISA field may divide the instruction set into two subsets (ISA0 and ISA1). In some embodiments, an instruction 210 or 220 may comprise a 1-bit or 2-bit co-processor (CoP) field 202K to identify instructions for use by one or more special function application specific co-processor units. In some embodiments, an instruction 200, 210 or 220 may comprise a plurality of 4-bit fields such as 206, 207A, 208A, 206B, 207B, 208B that may specify secondary opcodes or operands which further define instruction behavior. In some embodiments, primary fields 201, 202, 203, 204 and 205 in instruction 200 (or 201A, 202A, 202K, 203A, 204A, & 205A in instruction 210) (or 201B, 202B, 202K, 203B, 204B and 205B in instruction 220, as the case may be) may be contained within a first 16-bit word that may be decoded in that instruction although their positions in the first 16-bits decoded may be different in different embodiments. Where a machine may only use 16-bit instructions 200 exclusively, the LEN field may not be expressly needed and may be replaced by the CoP field. In some embodiments, two 32-bit instructions 218 and 217 may be decoded together as a 64-bit instruction. In some embodiments, a 16-bit instruction 200 and a 32-bit instruction 210 may be decoded together as a 48-bit instruction. In some further embodiment, one or more 16-bit instructions 212B may be decoded with a 48-bit instruction as a 64-bit or larger sized instruction.

Referring now to FIG. 2B, some exemplary instruction types (in this context also referred to as "instructions") in a computer-implemented instruction set in some machine embodiments are illustrated. In some embodiments, a variety of 16-bit instructions 250 are shown which comprise primary fields LEN (provides length related information), Op Modifier 275 (which is the opcode modifier OPM), ISA field (which partitions the instruction set into two or more sub-sets (ISA0 & ISA1) and Opcode_0 (primary or major opcode). They may further comprise an immediate operand such as Imm8 or Imm4, a first destination or first source operand X, a second source or second destination operand Y or additional secondary opcodes such as Opcode_1 and Opcode_2. In some embodiments, payload instructions such as 251, 252 and/or 253 are used to provide immediate operands to all instructions that may use those immediate operands, in part or in full. This is described further in a latter section in this disclosure. In some embodiments a 16-bit payload instruction 251 may provide an 11-bit immediate operand (using Imm8+Imm3 forming 11-bits) to be used by an instruction. In some embodiments using exclusively 16-bit instructions a payload instruction such as 251 may provide a 12-bit immediate operand by eliminating the Len field (using Imm8+Imm3+Imm1 in lieu of 1 bit Len forming 12 bits of immediate operand). In some embodiments, a 32-bit payload instruction 252 may provide a 24-bit immediate operand, or portions thereof, to an instruction that may use the operand. In some embodiments, a 64-bit payload instruction 253 may provide a 56-bit operand to an instruction that may use the operand. The exact manner in which the payload instruction works in conjunction with other instructions to provide an immediate operand for use is disclosed in a latter section in this disclosure. FIG. 2B also shows some further aspects of using 32-bit and 64-bit instruction types in various embodiments. In some embodiments, two adjacent 4-bit fields may be combined to create 8-bit fields while in some other embodiments a 4-bit field may be split into 2-bit fields such as Field_2; in some embodiments 2-bit and 4-bit fields may be combined into 6-bit fields such as Field_6. In some embodiments, more secondary operands such as Z may be used; in some embodiments using 32-bit or longer instructions, more secondary opcodes such as Opcode_3 may be used.

Figure 2C:
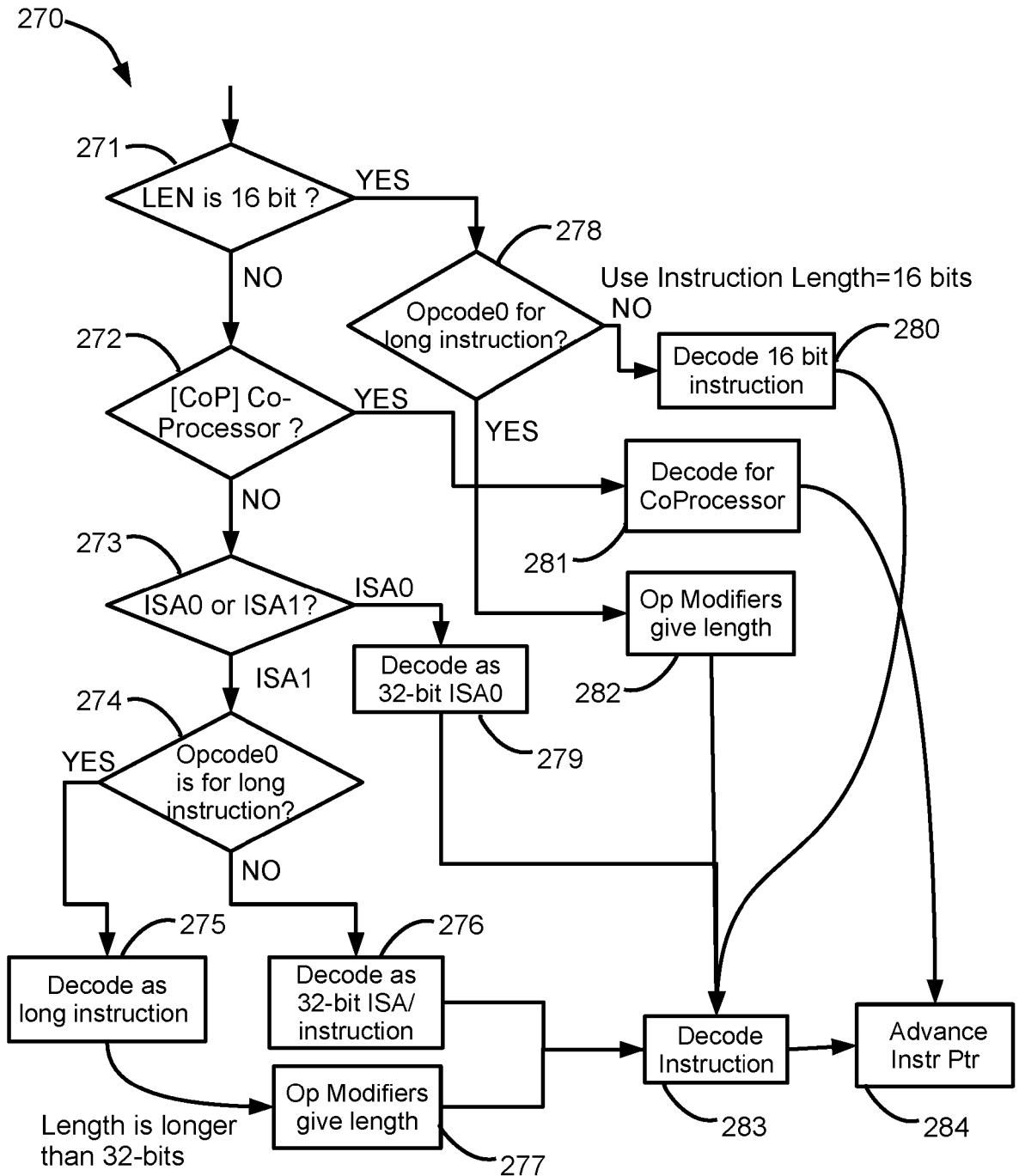
FIG. 2C illustrates one method for instruction length decoding in some embodiments.

Referring now to FIG. 2C, an exemplary flowchart of a method 270 for instruction length decoding in some embodiments is illustrated. The flowchart in FIG. 2C outlines some embodiments of a method utilizing the LEN field, the ISA field, and the Op Modifier field to determine the length of an instruction. In some embodiments, using instructions 200 and 210 (FIG. 2A) in method 270, in step 271 when the LEN bit 201 indicates a 16-bit instruction it leads to step 278 where Opcode0 is tested to determine a long instruction (48-bit or longer). If the determination in step 278 is positive then it leads to step 282, and if the determination in step 278 is negative then it leads to step 280 where instruction 200 is decoded as a 16-bit instruction; thereafter instruction decode completes in step 283 and the instruction pointer is advanced accordingly in step 284. When it is determined that instruction 200 may be interpreted as 16-bits long it may be dispatched to the 16-bit decoder. In step 271 when LEN bit 201A does NOT indicates a 16-bit instruction then instruction 210 is examined in step 272 to determine if it is a co-processor instruction. If instruction 210 is a co-processor instruction, then it is decoded as a co-processor instruction in step 281; thereafter instruction decode completes in step 283 and the instruction pointer is advanced accordingly in step 284. If instruction 210 is determined NOT to be a co-processor instruction in step 272, then it is further examined in step 273 to determine if the ISA field indicates a 32-bit ISA0 instruction or a longer ISA1 instruction, which would prompt steps 274-277. In this embodiment ISA0 and ISA1 are the two subsets of the instruction set architecture as disclosed in the context of ISA field description earlier. If instruction 210 is determined to be a 32-bit ISA0 instruction it is decoded as such in step 279; thereafter instruction decode completes in step 283 and the instruction pointer is advanced accordingly in step 284.

In some implementations, a 32-bit instruction 210 immediately adjacent to a 16-bit instruction 200 may jointly be treated as one 48-bit instruction based on the value of embedded OPM field 201B and Opcode0 204B in the 32-bit instruction. In some aspects, a 48-bit composite instruction may comprise a 16-bit instruction 212B with its LEN bit 201 indicating 16-bit length, and an adjacent 32-bit instruction 220 whose LEN bit 201A may indicate 32-bit length. In some embodiments, the 16-bit portion of the 48-bit instruction may be decoded by a 16-bit decoder while the 32-bit portion of it may be decoded by a 32-bit decoder and the two decoded results may be merged to form the final decoded operation. This may make the instruction decode much simpler even with a plurality of lengths that occur. In some embodiments, where the 16-bit instruction decode may determine that its Opcode0 204 may be a Payload Immediate, or a 48-bit instruction Opcode (as in the flowchart of FIG. 2B), the succeeding adjacent 32-bit instruction code may be concomitantly decoded with this 16-bit instruction code and together they may form a 48-bit instruction. In some embodiments, the 64-bit instructions may comprise two adjacent 32-bit instruction codes 217, 218 where the first one 217 may comprise an Opcode0 value and/or an OPM field value that may indicate the 64-bit length. In some aspects, a sequence of a plurality of Payload Immediate instructions 250-255 may be concatenated to create instructions that are effectively 32 bits, 48 bits, 64 bits or longer. In some implementations, the Payload Immediate instructions may be complete in themselves and may be decoded and executed as such.

Matrix and Array Processing

Figure 3A:
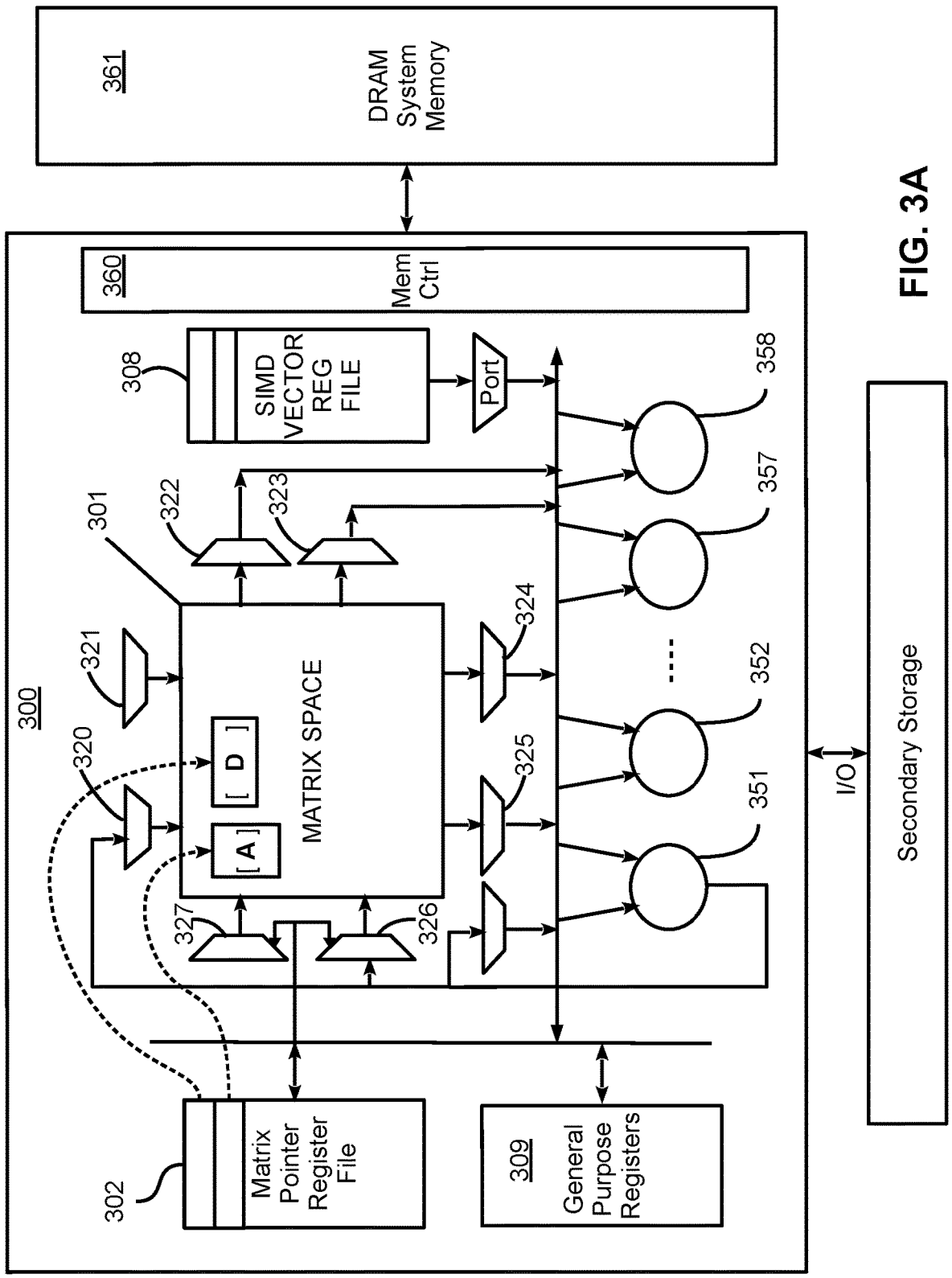
FIG. 3A illustrates a computing processor comprising a Matrix Processing Unit that comprises a Matrix Space and a matrix pointer register file in accordance with some embodiments.

Referring now to FIG. 3A, some embodiments of a computing processor 300 comprising a Matrix Processing Unit (MPU) are illustrated. In some embodiments, the matrix processing unit may comprise a Matrix Space 301 with ports 320, 321, 322, 323, 324, 325, 326 and 327, a matrix register file 302, and a set of matrix execution units comprising 351, 352 through 357 and 358. In some embodiments, the Matrix Space may comprise a RAM that may be accessed by its rows, as well as, by its columns, or by both rows and columns in two dimensions X and Y, separately or concurrently, to read, write or manipulate matrix (includes vectors also) and array data by their rows or by their columns, or both. In some embodiments, the MPU may also work in conjunction with a vector (or a vector SIMD) register file 308 and/or scalar and/or general purpose register file (scalar register file) 309. In some embodiments as shown in FIG. 3A, the MPU may receive data from a system memory (DRAM in some embodiments) 361, and/or some other tightly coupled, and/or loosely coupled memories, and/or embedded memories (not shown) using a memory controller 360. These memories (system memory, embedded memories, tightly or loosely coupled memories) configured and controlled by memory controller 360 are henceforth called "main memory" and are distinguished from a Matrix Space in this disclosure. The program instructions for matrix computing may reside in the system memory 361 and/or in a main memory, which are accessed and decoded in computing processor 300 and used to control various logic entities comprising the Matrix Space 301, matrix register file 302, ports 320 through 327, vector register file 308 (with its ports), scalar register file 309 and matrix execution units 351, 352 through 358. Data may be fetched from system memory 361 and/or a main memory into the Matrix Space 301 in accordance with the configuration provided in matrix register file 302 using matrix load instructions (to be disclosed in a latter section). Matrix and array computations may be conducted using matrix and array instructions with the data in the Matrix Space 301, and/or in scalar register file 309, and/or in vector register file 308.

In some aspects, regions of a Matrix Space may be pre-allocated to predefined matrices, arrays, processes, process threads, data types, instruction sequences from a particular customer (or user/owner of some data/process—henceforth "customer"), or to a single thread of instructions, or even different virtual machines, and host and various guest operating systems, as non-limiting examples. In some aspects, the MPU may run an algorithm to determine where to put specific data based on user-friendly coding instructions and security considerations including ownership. The MPU may run off predefined criteria, such as word size or data type, as non-limiting examples.

In some implementations, this may allow the MPU to make better and more efficient use of a Matrix Space. This may also allow the MPU to have more overall space. In some aspects, the process shown in the Matrix Space may also be stride-less in order for the MPU to run at maximum efficiency, since the Matrix Space may be accessed by rows and/or by columns, and by both rows and columns concurrently, when necessary. In contrast to using strides to identify an adequate size in the Matrix Space on an as-needed basis, the present disclosure pre-allocates space (called matrix allocation, henceforth "allocation") within regions in a Matrix Space as configured by matrix pointer registers in various embodiments. In some aspects, the Matrix Space may hold one or more matrices, and/or arrays and/or vectors comprising data in a manner configured by one or more matrix regions and matrix pointer registers. In some embodiments, a specific customer, or program thread, or process may have a pre-allocated space where the same pre-allocated space is used each time instructions are run for that specific customer or program thread, or process.

There may be a noticeable space optimization in the Matrix Space using pre-allocation instead of using stride. In some implementations, the overlap may be based on pre-defined, acceptable, or determined similarities, such as by data type, program type, or customer. For example, in some embodiments different data sets may have overlapping pre-allocated space for the same customer, or process thread, or process. In some embodiments, the pre-allocated space may comprise a 16-bit space, which may allow for data sets of 4, 8, and 16 bits. The determination may be manually selected by the user, or there may be an auto determination from the MPU based on the type of input and which organizational tool may best fit the need of the MPU.

Figure 3B:
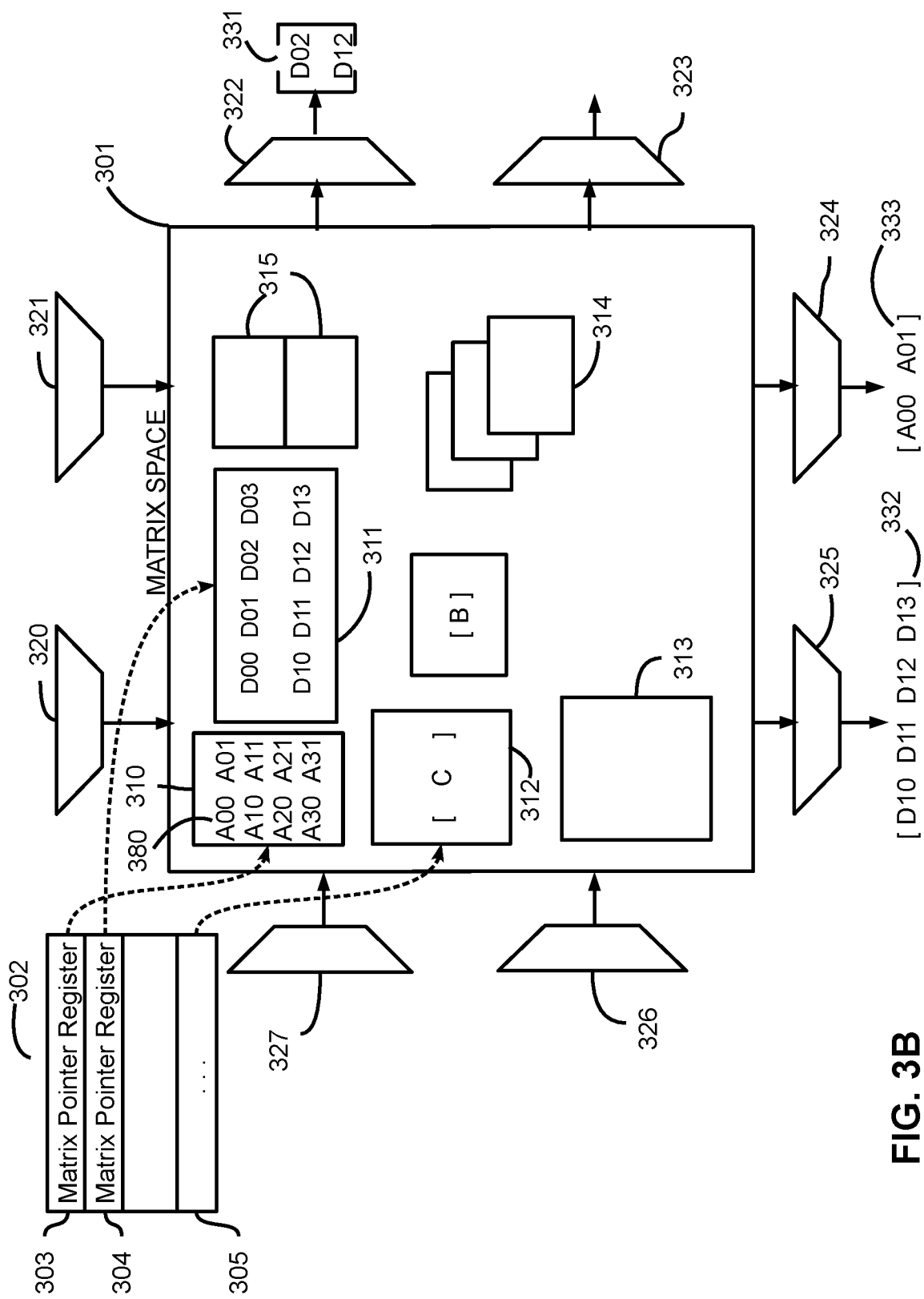
FIG. 3B is a functional diagram of a Matrix Processing Unit comprising a Matrix Space with row and column ports, holding matrices and arrays addressed by associated matrix pointer registers inside a processing unit in operation in accordance with some embodiments.

Referring now to FIG. 3B, in some embodiments a computing processor 300 may use different mechanisms inside a Matrix Processing unit. In some aspects, inside a computing processor 300, one or more embedded (special Random Access Memory (RAM) like) storages such as 301 called Matrix Space may be used to hold a plurality of Matrices (Matrixes) A 310, B, D 311, C 312, 313, Matroids 314 (arrays of higher than 2 dimensions used in mathematics, physics and engineering) or multi-dimensional (numerical or non-numerical) Arrays 315 for computation inside a processing unit as configured by contents of one or more matrix pointer register files such as 302. Matrix A 310 is configured and addressed using matrix pointer register 303 under the control of a matrix instruction, and any individual row of matrix A such as row 333 holding [A00 A01] may be accessed on a port 324. Similarly, in some embodiments, the matrix D may be accessed on row port 325 by its rows such as 332, and by its columns 331 on column port 322. This may be done simultaneously/concurrently or separately. In this context a matrix instruction is simply a machine instruction which may access a Matrix Space for some functionality. In some embodiments, in non-limiting examples, it may also be possible to access sub-matrices, transposed matrices, diagonals, triangular and multi-diagonal portions of a matrix among others, for computation, manipulation and storage. The Matrix Space may comprise a RAM that may be accessed by its rows as well as by its columns in two dimensions X and Y in a single semiconductor chip. In some implementations, the RAM may be accessed another way if programed to do so by the user or the customer for preference purposes. In some aspects, the Matrix Space RAM may be accessed in 3 dimensions X, Y, Z, where the Matrix Space RAM may be implemented over semiconductor chips that may be stacked to create 3-Dimensional chips. In some embodiments, a 3-Dimensional Matrix Space with Ports in all 3 dimensions may provide access to Matroids and Arrays (held in 3-D) in 3-Dimensions.

Figure 3C:
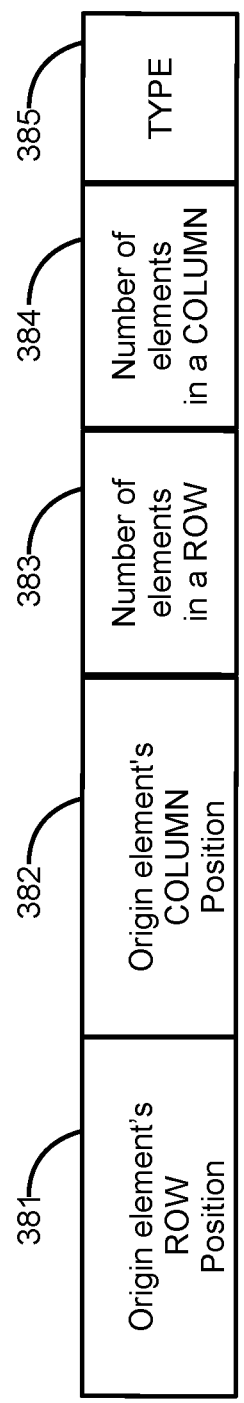
FIG. 3C illustrates fields of a matrix pointer register in some embodiments.

Referring to FIG. 3C, in some embodiments, the fields of a Matrix Pointer Register such as 303 (FIG. 3B) are as illustrated. These comprise a row position (henceforth "row address") 381 of an origin element of a matrix, a column position (henceforth "column address") 382 of an origin element of a matrix, number of elements in a row (henceforth "row size") 383 (equal to the number of columns of a matrix "#cols"), number of elements in a column (henceforth "col size") 384 (equal to the number of rows of a matrix "#rows"), and type of elements in the array (henceforth "Type") 385. Here the row address 381 and column address 382 (henceforth jointly written as "row, col address (381, 382)") jointly provide the allocation location (location of an origin element of a matrix or array) inside the Matrix Space. Also, the row size, column size (383, 384) jointly provide the allocation size for a matrix or array inside the Matrix Space. In some embodiments, the Type 385 may identify the elements of a matrix, vector or array as nibbles, bytes, short integers, integer words, 32-bit integers, long integers, 64-bit integers, long long integers, pointers (to a memory location), half precision floating point numbers, single precision floating points, double precision floating points, extended and quad precision floating point numbers, ordered pairs (a collection of 2 values) of any integer types, ordered pairs of any floating point types, ordered quads (a collection of 4 values) of any integer types, ordered quads of any floating point types, triads of integer types, triads (a collection of 3 numbers) of floating point types, ordered quads or triads or pairs of nibbles or bytes, untyped values with no designated type which may comprise collections of a user-defined number of bits each, and any other types not limited to the aforementioned, as used in an implementation.

Accessing and Computing with a Matrix in a Matrix Space Using Matrix Pointer Registers Referring to FIGS. 3A-3C, in some embodiments, a set of Matrix Pointer registers 302 along with a subset of instructions called matrix instructions in a computer-implemented instruction set may be used to access these matrix and array entities from a Matrix Space 301 in a computing processor 300. In some embodiments, the matrix instructions may execute array or matrix operations for matrix arithmetic inside the computing processor 300 using a plurality of execution units 351, 352-357, 358, parallelly. In one example, in some embodiments, some Matrix A may be stored in an allocation 310 inside the Matrix Space 301 inside a computing processor 300, and may be pointed to by the contents of a Matrix Pointer register 303. In some embodiments the fields of the Matrix Pointer register 303 are as shown in FIG. 3C. Referring to FIGS. 3A-3C, in some embodiments during operation, a Matrix Pointer register 303 whose contents point to a Matrix A at allocation 310 may hold a row address 381 and a column address 382 of the location of a specific element called the origin 380 (typically a corner location like A00 of matrix A) of an allocation 310 in the Matrix Space; it may also hold the row size (number of row elements) 383 and column size (number of column elements) 384 of the matrix, and its Type 385. In some aspects, the addresses of two diagonally opposite corners (like the top-left and bottom-right corners) of the corresponding matrices (matrixes) inside a Matrix Space may be obtained using the fields 381, 382, 383, 384 and interpreted along with the Type 385 of the elements of matrix A, and similarly for a matrix D in allocation 311. Based on the operation type, the rows or columns (or both) of matrix A and matrix D may be read out one or more at a time, either separately, or concurrently, and used in computing the result. In some embodiments, a row 333 of matrix A with contents [A00 A01] may be read out on port 324. At the same time (or at a different times) a column 331 with contents [D02 D12]$^T$ of matrix D may be read out on column port 322, and row 332 with contents [D10 D11 D12 D13] of matrix D residing at allocation 311 may be read out on row port 325. The rows and columns of D may be read out at the same time or at separate times in various embodiments.

In some aspects, a matrix or array in Matrix Space may be controlled, accessed, read out or written into by using the fields in a longer machine instruction with operands that provide the location, size and type of the said matrix or array, thereby not employing a matrix pointer register.

Referring to FIGS. 3A-3C, as an illustrative example, in some embodiments the result of a matrix operation may be computed using execution units such as 351 through 358, such as illustrated in FIG. 3A, and the result may be deposited into a Matrix C at allocation 312, as illustrated in FIG. 3B, at the location specified by contents of matrix pointer register 305, via the port 320 and/or port 327. The Type 385 of C may be updated into matrix pointer register 305 correctly based on the result produced by the instruction. In some aspects, where a computation may require additional matrices, vectors or scalar values, these may be read using appropriate methods and utilized in the computation or in the generation or storage of a result. The result(s) of an operation may be written into a matrix held inside the Matrix Space by row or by column (or both); a vector result may be written into a vector register, and/or a scalar result may be written into a regular scalar register, as specified by an instruction. The process of accessing or computing may be similar for an array comprised of non-numeric elements held in the Matrix Space.

Matrix Instructions

FIG. 4 illustrates some embodiments of matrix instruction types that may be implemented in some matrix processing units (MPUs) for matrix and array processing; some non-limiting classes of matrix instructions comprise instructions for matrix arithmetic, logic, transport, string, matrix manipulation, matrix-matrix operations, matrix-vector operations, matrix-scalar operations, and other array operations. In some embodiments of FIG. 4, matrix instructions may comprise a class whose operands comprise one or more matrix operands and one or more other operands like scalar registers, immediate values, and/or row and/or column numbers (matrix-scalar). These may comprise instructions to count the number of elements in a row or column or add a scalar value to all elements of a matrix and so on. The matrix instructions may additionally comprise: a class whose operands comprise one or more matrix and one or more vector operands (matrix-vector); and a class whose operands comprise two or more matrices with a result that is a matrix or array (matrix-matrix).

As illustrative examples, the following may be a partial and exemplar list of matrix operations that may be performed in some embodiments: a matrix or array may be loaded from System Memory or a main memory and/or a cache into a Matrix Space; a matrix or array may be stored to System Memory or a main memory or a cache from a Matrix Space; individual rows or columns of elements of a matrix or array may be accessed for reading or writing or moving them to other storage elements in a matrix space; in some embodiments, rows or columns of a matrix may be used for vector operations with vectors in matrix space or in vector registers. In some embodiments, elements of rows and/or columns of a matrix or array, under control of a matrix instruction, may be counted, re-ordered, sorted, scaled, summed, multiplied, AND-ed, OR-ed, negated, logically inverted, tested, compared and zero-ed. Any number of other similar arithmetic, logical, and transport operations may be performed. In some embodiments, some further operations by matrix instructions may comprise the following: a matrix or array in a Matrix Space may be moved, copied, split, transposed, or reordered in part or in full. In some embodiments, a further list of operations by matrix instructions may comprise addition, subtraction, multiplication. convolution and other matrix arithmetic, logic, discrete math, string and flow control operations involving matrices, vectors, arrays, scalars or other multi-dimensional structures.

In some embodiments, linear algebra related operations comprising triangulation or linear transformation operations, tri-diagonalization, norm calculations, rotations, computing determinants or rank, auto-correlation and cross-correlation may be performed on matrices; sparse matrix or sparse arrays may be created/decompressed or compressed, and/or scattered/gathered, transported, and/or transformed; matrix or array arithmetic, logic, discrete math and flow control operations may be performed on sparse matrices and sparse arrays; other elementary matrix, array or graph processing including search, sort, swizzle, rearrange, filter, text and string processing, graph traversal, table pivoting and many others may be executed. In some embodiments, one or more neural computations and transcendental computations and dynamic programming computations comprising multi-dimensional convolutions, maxpooling, average pooling sigmoid, and hyperbolic and trigonometric functions, max, min minmax, softmax, pivoting, flattening, sampling, interpolation, decimation, ReLU, and operations for gradient descent may be performed by one or more matrix instructions.

In some embodiments, a scalar register may be added to or subtracted from a Matrix Pointer Register. An Immediate value to or from a Matrix Pointer Register may be added or subtracted. A Matrix Pointer may be moved to another Matrix Pointer or to a general register. A Matrix Pointer register may be loaded and stored. Other operations may be performed on contents of a Matrix Pointer register.

Referring now to FIG. 5, an exemplary program sequence that may compute with matrices in some embodiments is illustrated. In some aspects, a binary image may be executed on the embodiment. In some embodiments, in the context of FIGS. 3B and 5, the program of FIG. 5 initializes the matrix pointer registers 303, 304 and 305 with pointers to the matrix allocations 310, 311 and 312 in a Matrix Space 301 for matrices A, D and C, respectively; this is followed by loading the elements of matrices A and D from a main memory into their matrix allocations 310 and 311 respectively. Thereafter, a matrix instruction 551 with the source operands as matrix pointer register 303 pointing to matrix A at allocation 310, and matrix pointer register 304 pointing to matrix D at allocation 311 may be executed. In some embodiments, instruction 551 may take as the destination operand matrix pointer register 305 pointing to matrix C at allocation 312. In some aspects, the contents of matrix pointers 303, 304 & 305 may be obtained prior to the instructions 551.

Figure 6:
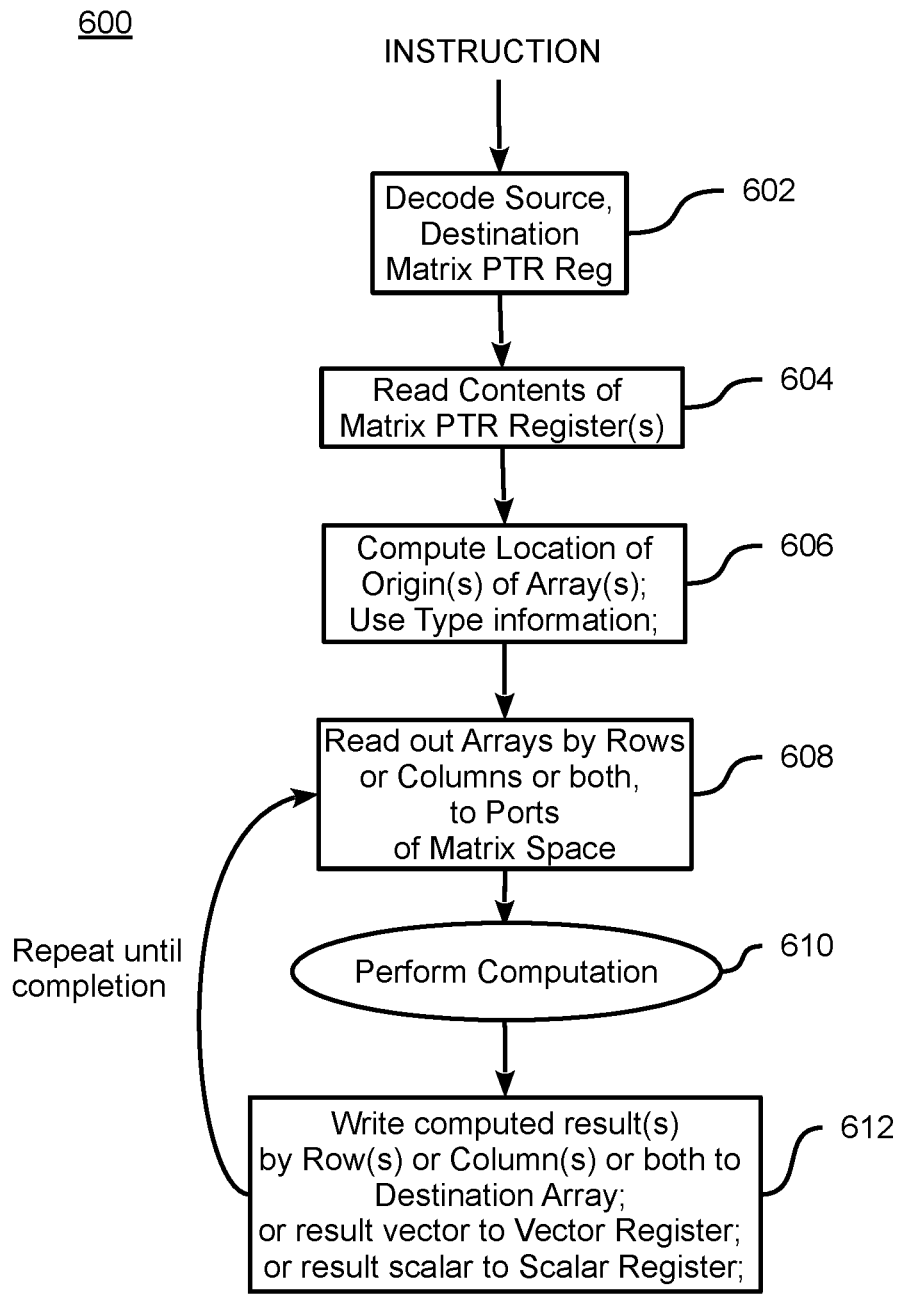
FIG. 6 illustrates a flowchart of an exemplary method of executing a machine instruction to perform a matrix arithmetic or array computation in some embodiments.

Referring now to FIG. 6, a flowchart of some embodiments of a method 600 of executing a machine instruction to perform a matrix arithmetic or array computation is illustrated. In step 602 of method 600 a matrix instruction is decoded and one or more source and destination operands including operands which are matrix pointer registers are determined/decoded. In step 604 contents of the operand matrix pointer registers are read. In step 606, location of the origins and sizes of one or more arrays, and the Type of the one or more arrays is determined. In step 608 the one or more arrays are read out by rows or columns or both (as configured and controlled by the matrix instruction) to ports of the Matrix Space. In step 610 the computation associated with the instruction is performed. In step 612 the one or more results are obtained; if the results are matrices or arrays they are written by rows or columns, or both, into the matrix allocation of the destination array in the Matrix Space; if the one or more destinations are vector registers and one or more results are vectors then they are written into the destination vector registers; if the one or more destinations are scalar registers and one or more results are scalars then they are written into the destination scalar registers. In some aspects prior to accessing the contents of the Matrix Space a security and correctness check may also be conducted in Hardware. In the event of a protection error, access error or an execution error, an appropriate abort, or trap, or fault or exception may be taken.

Loading a Matrix from System Memory

Figure 7:
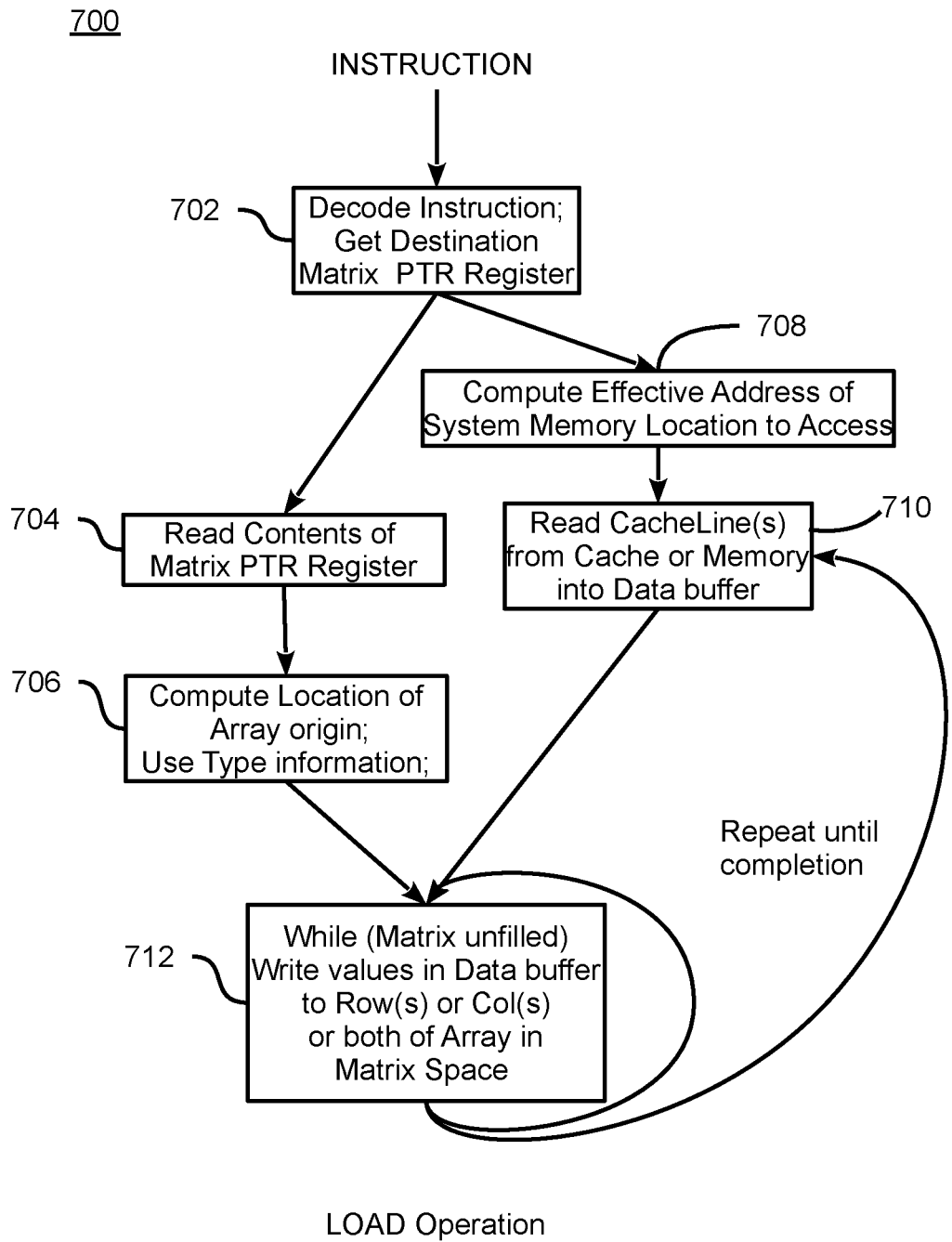
FIG. 7 illustrates a flowchart of an exemplary method to load a matrix or array from system memory in some embodiments.

Referring now to FIG. 7, a flowchart of some embodiments of a method 700 to Load a matrix or array from System Memory or a main memory are illustrated. In some embodiments, an array or matrix may be loaded from system memory or a main memory into a Matrix Space. In step 702 of method 700 a load matrix instruction is decoded and one or more source and destination operands including operands which are matrix pointer registers are determined/decoded. In step 704 contents of the operand matrix pointer registers are read. In step 706, location of the origins and sizes of one or more arrays, and the Type of the one or more arrays is determined. In step 708 an effective address of a location in system memory or a main memory to access is computed. In step 710 a read operation is performed to read contents into a data buffer using the effective address from the associated location in the system memory or main memory, or one or more corresponding cache lines from a cache associated with the main memory. In step 712, the data in the data buffer associated with the load matrix instruction is written into a matrix allocation configured by a destination matrix pointer register, by rows, or by columns, or both. Steps 710 and 712 may be repeated till all the data controlled by the load matrix instruction are loaded.

As an illustrative example, following this flowchart in the context of some embodiments in FIGS. 3A-3C and using some embodiments of a LOAD Matrix instruction, the method to load a matrix A into Matrix Space is as follows. A LOAD Matrix instruction may be read and decoded within the computing processor 300 and the number of a Matrix Pointer register 303 may be decoded to its address. Also decoded may be the address of a register holding a pointer to a main memory location. The effective address of a main memory (which may be an external DRAM or any other generic embedded memory) location may be computed using the pointer to the main memory location read from the register; and a block of data containing the values of the elements of Matrix A may be obtained into a data buffer from the memory 361 or a cache inside the computing processor 300. The contents of Matrix Pointer register 303 may be obtained, and the location of an allocation 310 using the fields 381, 382 and size of Matrix A in terms of the number of row elements (row size) 383 and column elements (column size) 384 are determined.

The contents of register 303 including its Type information may be set up appropriately for Matrix A prior to or at the completion of the LOAD Matrix instruction by itself or by one or more instructions in the program sequence. The contents of the data buffer may be read and transferred in chunks comprising a plurality of elements into the rows or columns, or both rows and columns of Matrix A into the allocated location 310 in Matrix Space 301 via a plurality of ports 320, 321, 326, 327. The LOAD Matrix instruction may then be retired, thereby completing the process.

Storing a Matrix to System Memory

Figure 8:
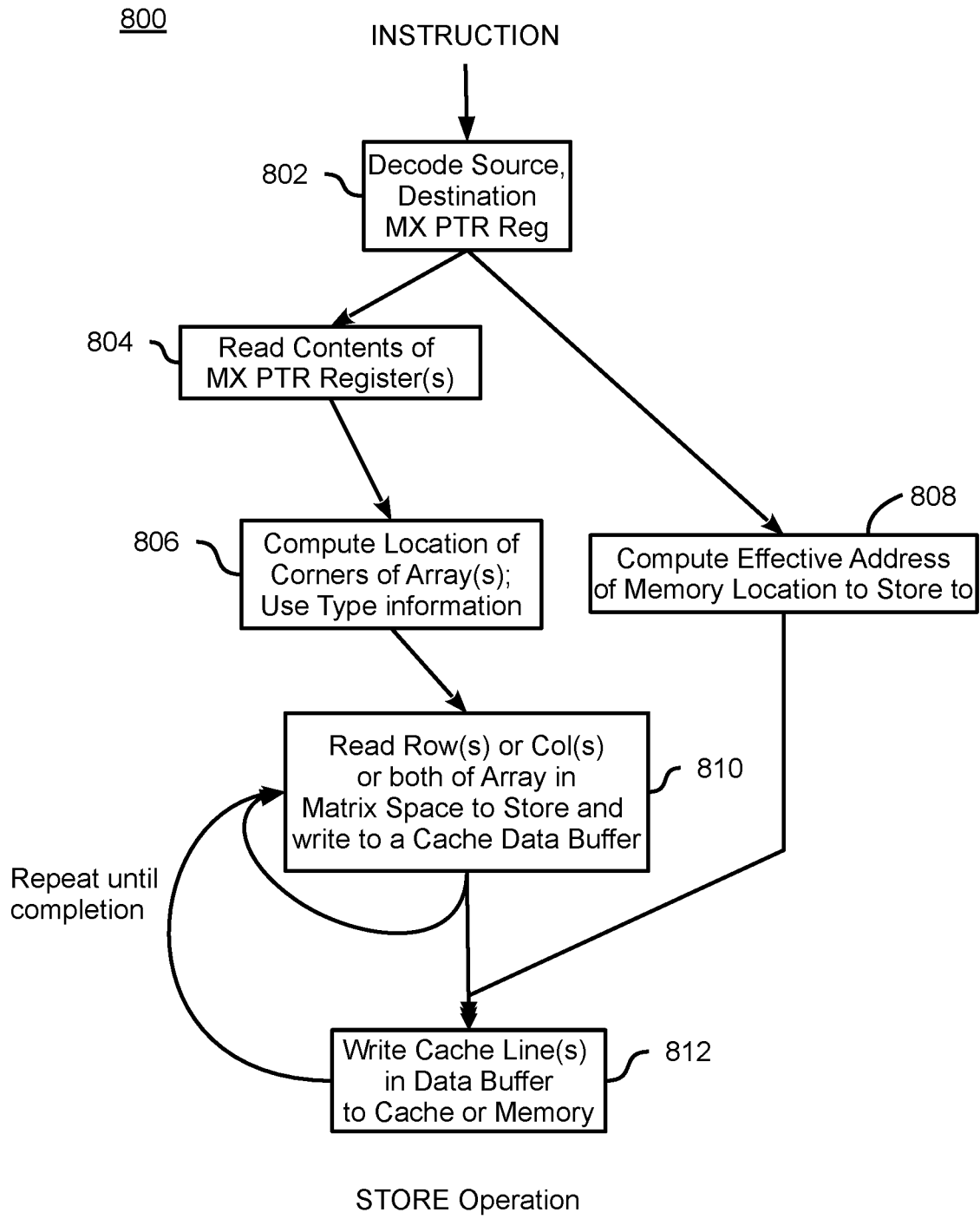
FIG. 8 illustrates a flowchart of an exemplary method to store a matrix or array into system memory in some embodiments.

Referring now to FIG. 8, a flowchart of some embodiments of a method to Store a matrix or array into System Memory or a main memory are illustrated. In some aspects it may be necessary to store a result matrix (or matrices) from a Matrix Space after a computation into system memory or a main memory. In step 802 of method 800, a STORE Matrix instruction is decoded and one or more source and destination operands including operands which are matrix pointer registers are determined/decoded. In step

804 contents of the operand matrix pointer registers are read. In step 806, location of the origins and sizes of one or more arrays, and the Type of the one or more arrays is determined. In step 808 an effective address of a location in system memory or a main memory to access is computed. In step 810 the one or more arrays are read out by rows or columns or both (as configured and controlled by the matrix instruction) from the Matrix Space and written into a data buffer (or a cache data buffer). In step 812 the data in the data buffer are written using the effective address into the associated location in the system memory or a main memory, or into one or more corresponding cache lines of a cache associated with the main memory. Steps 810 and 812 may be repeated till all the data controlled by the STORE Matrix instruction is stored.

In some aspects, the user may follow the method in the flowchart shown in FIG. 8 to store a Matrix A 310 in Matrix Space 301, in some embodiments illustrated in FIGS. 3A-3C. In some embodiments, a program may set up location 381, 382, size 383, 384 and Type 385 information for A into a Matrix Pointer Register 303 prior to the STORE Matrix instruction execution. In some aspects a STORE Matrix instruction may be decoded inside computing processor 300 and the number of a register holding a pointer of a location in system memory may be determined along with the address of the Matrix Pointer register 303. In some embodiments, the pointer may be used to compute an effective address pointing to the location of a buffer in memory or may also be used to find its image in a cache into which matrix A is to be written. In some implementations, the contents 303 may be read giving the extent or size of Matrix A at 310 along with the position of 310 as discussed earlier in this disclosure. The contents of Matrix A may also be read from its location 310 inside Matrix Space 301 by row, or by column, or both and transferred to Data Buffer. The contents of the data buffer may be transferred to a cache or an embedded memory in the chip or to system memory 361 or a main memory at the 625 computed effective address, and thereafter the instruction may be retired to complete the process of storing matrix A.

Access Control and Space Allocation for a Matrices Used in a Process

Figure 9:
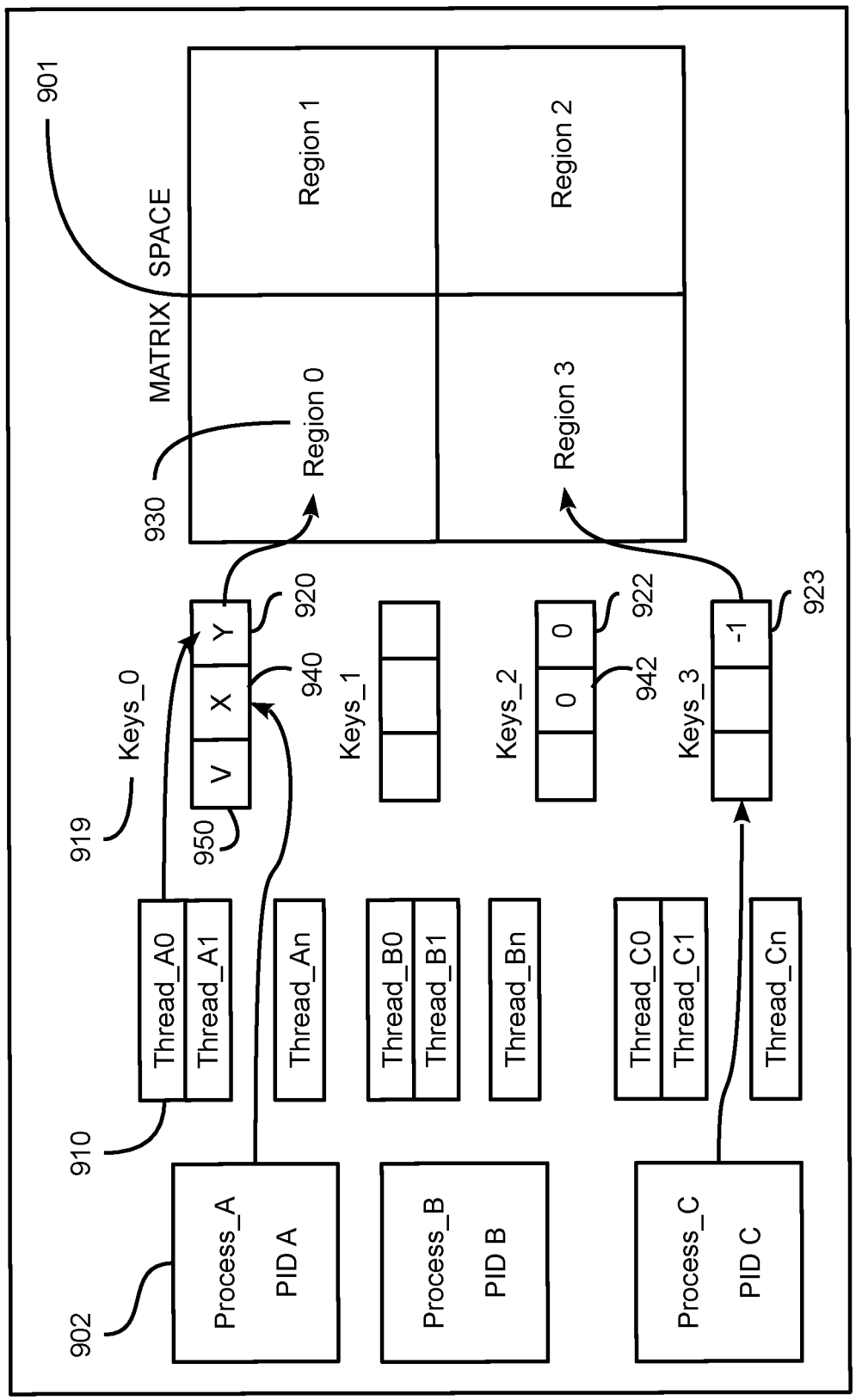
FIG. 9 illustrates a Matrix Space divided into 4 matrix regions, wherein each matrix region may be secured by a group of keys as in some embodiments.

Referring now to FIG. 9, some embodiments of a Matrix Space divided into Matrix Regions are illustrated, wherein each Matrix Region may be secured by a triad of keys. In some embodiments, a Matrix Space 901 in a processing unit may be assigned or divided into one or more Matrix Regions to control ownership and access control rights to locations or allocations within it. Pre-allocation of Matrix Region may allow for uniquely secured sections, where access may be limited to a specific Matrix Region.

For example, a customer may be pre-allocated a single Matrix Region, wherein instructions for the customer may be run only in the pre-allocated Matrix Region. When not in use, the Matrix Region may not be accessible by other customers or programs and may not be processed as available Matrix space. This may allow for increased security. In some embodiments, the Matrix Space 901 may be divided into 4 matrix regions, each of which may be independently secured and/or shared by assigning them properties using one or more privileged instructions by an operating system or a virtual machine (VM) monitor (also referred to as a hypervisor) running on the machine. In some aspects, the properties of a region may be assigned by the OS or hypervisor based on policies that may be configured a priori and as requested by an application process. A process thread may make further OS calls to request a set of attribute values for sharing and security settings to govern the allocated region. In some implementations, at the time of region allocation, the OS may optionally clear the information content or values held in that region of the Matrix Space 901 in some embodiments. In some embodiments an allocation policy setting may be used to forbid any instruction from causing the contents of a region to be transferred to another region or be used as a source operand in a computation whose results go to another region. In some embodiments, regions in a Matrix Space 901 may be allocated and secured by an access control mechanism comprising a set of thread registers such as 910, a set of key registers such as 919 (Keys_0) (and also key registers Keys_1, Keys_2, Keys_3) and control logic in HW (not shown) working in conjunction with an OS or hypervisor. In some embodiments, a region 930 (Region 0) may be allocated and secured for a thread Thread_A0 registered in thread register 910 of a process 902 with process identifier numbered or named as Process_A by an Operating System call or hypervisor call. This call may use a privileged instruction for matrix region allocation to assign a free region to a process for matrix computing among those available in a list maintained by the OS or the hypervisor.

Locking and Unlocking Allocated Regions on a Context Switch or an Interrupt

In some embodiments of FIG. 9, in a Matrix Space 901 comprising 4 matrix regions, each matrix region may be controlled by a key register such as 919 comprising three key fields 920, 940 and 950 holding three keys Y, X and V respectively. In some aspects, a first key V called the Group Key V in a group key field 950 may be associated with either an OS (in a multi-OS environment) or a process group. In some embodiments, a Process Group Identifier may be associated with a process group comprising one or more processes collected into the process group; such a Process Group Identifier an identifier of a collection of PIDs (Process Identifiers), of processes running on a system under an OS. In some aspects, a second key X called the Process Key X in process key field 940 may be associated with an individual process via its process identifier (PID). In some embodiments, a third key Y called the Thread Key Y in thread key field 920 may be associated with a group of threads inside a process. In some aspects, each matrix region may have an associated Keys register with 3 fields each holding one of the above keys. One fixed value of a key may be used to block all threads of a process from accessing an associated region. Another fixed value of a key may be reserved for enabling all threads of a process to access that region of Matrix Space 901.

In some embodiments, a 0 value in the Thread Key field of a region may block all threads in a process from accessing the region, and all is value (equal to signed value −1 in some aspects) in that Thread Key field may enable all threads of that process to access the region. Similarly, a 0 value in the Process Key field of a matrix region's Key register may prevent every process in the associated process group from accessing the region, and an all 1s value may enable all processes in the associated process group to access that region of Matrix Space 901.

In some aspects, key values other than 0 or all is may be leased to individual processes by an OS or hypervisor, wherein the leasing may allow the one or more individual processes to access specific regions of Matrix Space 901 leased to them by an OS or hypervisor while blocking all other processes. Such a capability may be required when an interrupt occurs, and the OS is required to run some other process or a thread that may not access a region. In some implementations, this may allow the OS to quickly swap out a process or thread while locking that matrix region to all others. Upon resumption of the process leasing the region, the HW conducting access control may check and unlock the region to the thread(s) holding the correct keys once again.

In some embodiments, region 930 (Region 0) inside a Matrix Space 901 may be controlled in part by a Thread Key field 920 in a Key Register 919. In some aspects, holding a unique and non-zero value Y in Thread Key field 920 that may be assigned by an OS exclusively may secure region 930 (Region 0) to a thread Thread_A0 registered in thread register 910. Here, key value Y which may not be equal to all is (or all 0s), may authenticate and enable only a thread holding a corresponding private key such as Thread_A0 registered in thread register 910 of the Process_A 902 to access region 930 of the Matrix Space 901. In some other aspects, the private part of key value Y held by threads Thread_A0 and Thread_A1 assigned by an OS to them, non-exclusively between the two, may allow both of them to share and access region 930 (Region 0) while securing region 930 from other threads and processes. The exact encryption, decryption, key generation, key management, key assignment and key exchange schemes may be various and different in different embodiments.

In some implementations, the Thread Key field 923 controlled by Process_C may have an all is value (equal to a signed constant −1) in the keys register Keys_3 which may allow all threads of Process_C to access Region 3. In some embodiments, both the Process Key Field such as 942 and Thread Key Field such as 922 may hold a 0 value for each. This may lock up 705 region 2 to all processes and threads until an OS or hypervisor change the keys. In some aspects, the OS or hypervisor may unlock the region by loading a correct set of keys to provide appropriate access. In some implementations, the Key field 950 may be used to put a region under the control of an OS by a Virtual Machine hypervisor. In some embodiments, it may be controlled by an OS to restrict access to a smaller pool of processes that comprise a Process Group.

In some embodiments, a subset of keys or key fields may control only process level access privileges. This may be beneficial for system performance and ease of use. In some embodiments, keys may be used to control locking and sharing properties of individual regions or group of regions. In some aspects, Regions may be controlled recursively using multiple keys, and sub-regions or partitions of regions may be controlled more finely or coarsely using one or more keys.

In some implementations, instructions to Lock and Unlock using operands to copy to, write to, or control key registers may be provided for use by a process or its thread(s) for locking and unlocking matrix regions. The instructions may hold their matrices or arrays for computations. In some embodiments, a mechanism to encrypt the contents of a region or the keys may require authentication to secure the locking process. In some embodiments, no authentication may occur or be required. In some aspects, a customizable authentication may be installed up request.

Methods and Mechanisms for Handling Immediate Operands in Machine Instructions

Referring now to FIG. 10, examples of immediate mode instructions in prior art are illustrated. Prior Art may have a variety of machine instructions for moving, adding, subtracting and other operations that may use an immediate operand embedded in the instruction. As illustrated, exemplary prior art with two assembly level instructions consuming immediate operands may be referred to as immediate instructions. In some prior art, instructions may comprise a Move-Immediate (MVI) instruction, and an Add-immediate-to-Register (ADDI r_dest, r_src, imm16) instruction. In the case of MVI instruction, as in a CISC ISA, the instruction length may vary based on the length of the immediate operand. In some aspects, the varying instruction length may require a complex instruction length decoder that often consumes a lot of power and reduces efficiency. In other aspects of prior art, for example, an ADDI instruction of a RISC machine, the length of the immediate operand the instruction can take is fixed; and, there may be an arbitrary binary value with a larger number of bits that may not fit within the instruction length. The larger number of bits in the binary value may inhibit its use as an immediate operand. Due to the size exceeding the instruction length, it may require multiple instructions to achieve the same result, which increases power used and reduces efficiency.

Figure 11:
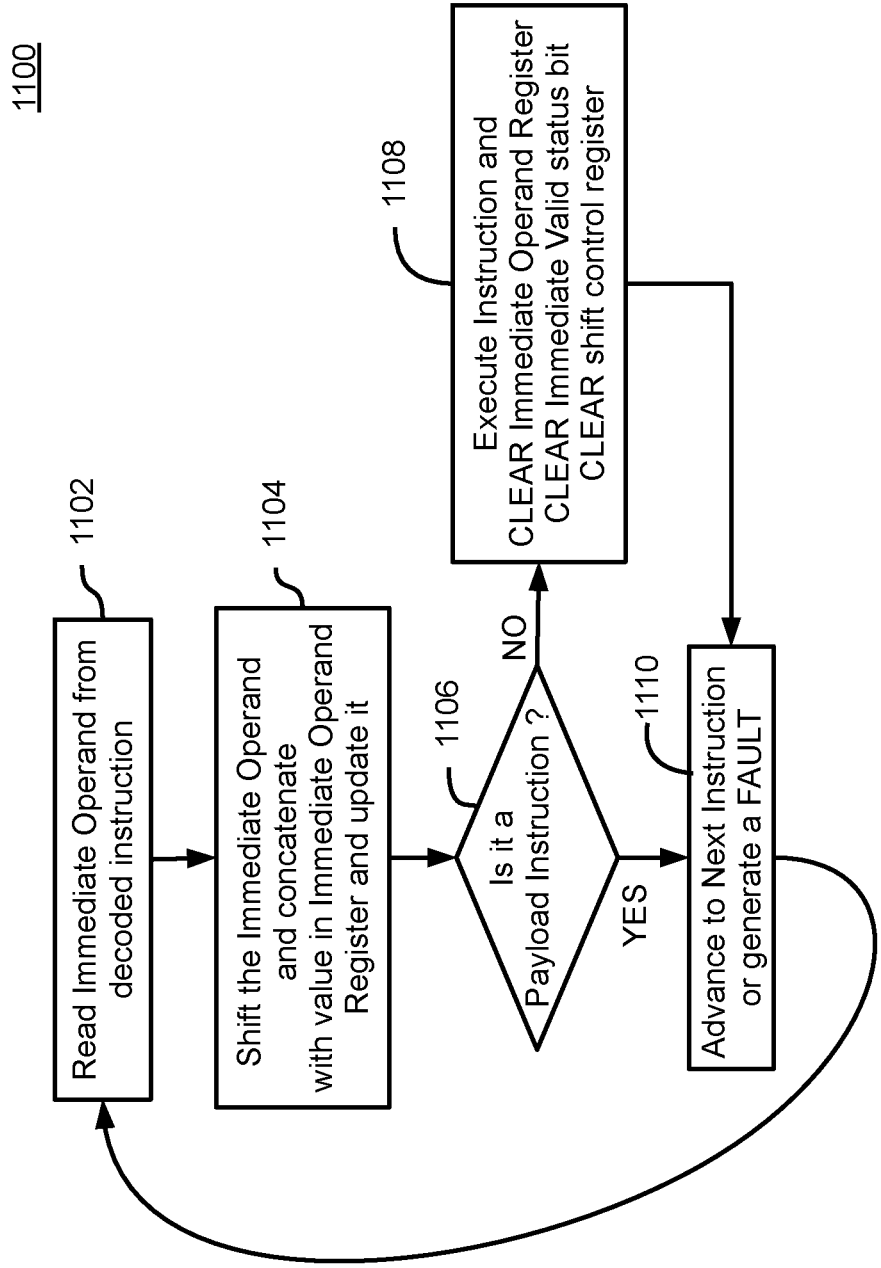
FIG. 11 illustrates a flowchart of an exemplary method to use payload instructions in conjunction with various instructions for computation in some embodiments.

Referring now to FIG. 11, a flowchart of some embodiments of a method 1100 to use Payload instructions in conjunction with various instructions for computation are illustrated. Optionally, method 1100 may be implemented in the context of any of the foregoing figures. In some embodiments, in step 1102 of method 1100 a first immediate operand value is read (when provided) from a decoded instruction and presented to a shifter. A second shift value may also be provided by the decoded instruction to a shift controller. If a first immediate operand value is not provided a 0 value is used. In step 1104 the first immediate operand value is shifted by an appropriate number of bit positions as controlled by the shift controller, and concatenated with an immediate value in an immediate operand register generating an immediate result value which is stored into the immediate operand register. In this context the concatenation operation on binary numbers means putting the binary numbers adjacent to each other and joining them to create a single binary number. In step 1106, the decoded instruction is examined and if it is NOT a payload instruction then a negative or NO indicator is flagged; or else for a payload instruction an affirmative or YES indicator is flagged. If a NO indicator is flagged then in step 1108, the decoded instruction is executed utilizing the immediate result value from the immediate operand register; thereafter the immediate operand register and the shift control register in the shift controller are both cleared to a default state (to 0 in some embodiments), and an Immediate Valid status flag is also cleared or invalidated, and step 1110 is executed thereafter. If a YES indicator is flagged in step 1106 then step 1110 is executed directly after step 1106. In step 1110, the instruction execution pointer is advanced to the next instruction; or in some aspects and in some situations during operation, a fault condition may be detected and a FAULT may be raised. This method 1100 may run multiple times starting with a decoded first payload instruction followed by a decoded second instruction.

In some embodiments, the method 1100 in the flowchart in FIG. 11 may be applied to an executing program sequence, such as shown in FIG. 12. In some aspects, a payload immediate instruction (henceforth "payload instruction") may also be at least partially decoded as a part of method 1100. In some embodiments, an initial shift value of 0 in a shift control register may be used with an initial first payload instruction in a sequence of instructions, and a first immediate operand value may be moved into an Immediate Operand Register without a shift. A decoded second instruction with a second immediate operand value may be shifted by the size of the first immediate operand value in the immediate operand register and concatenated with it.

Referring now to FIG. 12, some embodiments of assembly instruction sequences comprising Payload instructions used in conjunction with various instructions are illustrated. In some aspects, these embodiments may solve the problem of using longer immediate operands beyond what can be accommodated in a single machine instruction. In some embodiments this may be done by configuring a Payload instruction 1251, 1253, 1255 that moves an immediate value into an immediate operand Register (as shown in FIG. 12), which may occur prior to or immediately after a second instruction that uses the immediate value in an assembly or machine language program.

In some embodiments, a 16-bit long ADDI instruction such as 1254 using an immediate operand may have its immediate operand's length extended from a mere 4 bits to a longer 15 bits using a payload instruction such as 1251, 1253, 1255 with an immediate operand. In some embodiments a payload instruction such as 1253 may supply 24 bits to concatenate to the 4 bit immediate operand of the ADDI instruction 1254 to extend the value even to 28 bits while incurring very little additional cost. In some embodiments an assembly instruction sequence may use Payload 1251 instructions in conjunction with a modified ADDI instruction 1256 that does not contain any immediate operands (or with zero length immediate operand) and still compute the result using the method 1100. In some embodiments a plurality of payload instructions such as 1251 and/or 1253 may be cascaded in a sequence to create longer immediate operands using method 1100. In some embodiments, it may simplify the instruction decoder. In some aspects, it may be noted that the method disclosed in the disclosure is different from the prior art of loading a register with an operand using a move immediate instruction and then performing a second operation using that register operand. This is because any immediate operation itself may have its immediate operand extended using a Payload instruction and it may not consume an addressed register out of a register file. In some embodiments, the immediate operand length may be enhanced with each sequential Payload 1251 instruction before the immediate operand is consumed by an operation. In some embodiments the concatenation operation may be replaced with an addition or a logical operation.

Figure 13:
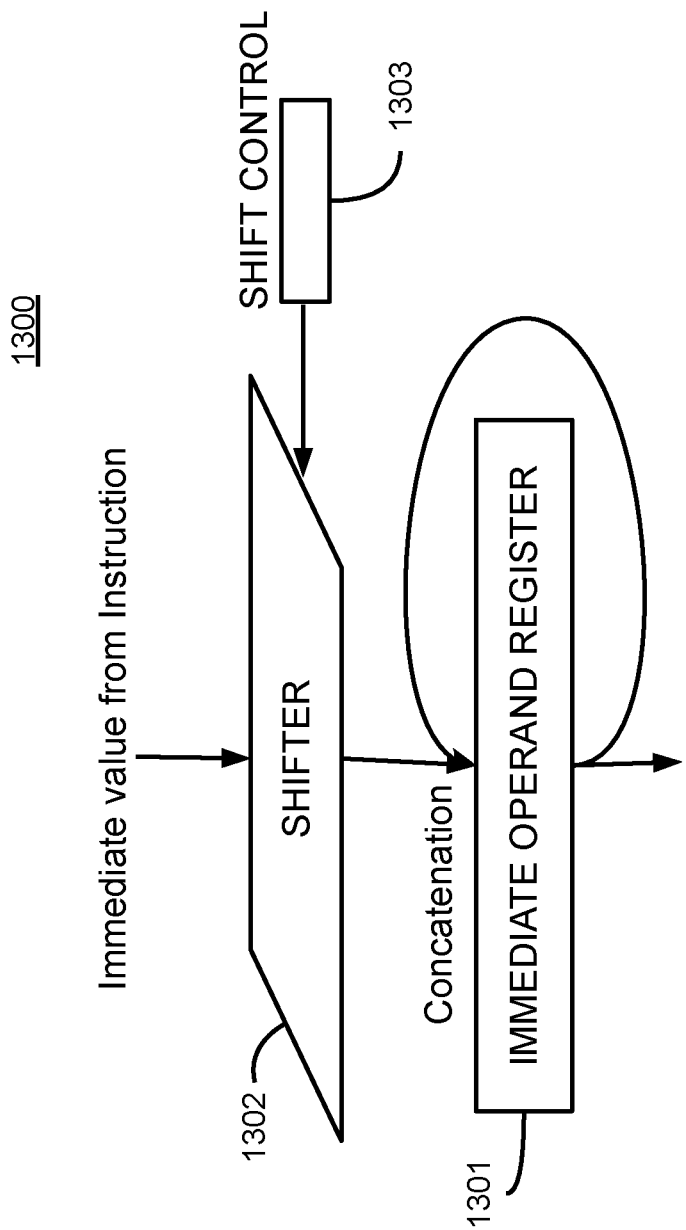
FIG. 13 illustrates a payload logic mechanism with an immediate operand register as in some embodiments.

Referring now to FIG. 13, an exemplary payload mechanism 1300 is illustrated in accordance with some embodiments. Optionally, the payload mechanism 1300 may be implemented in the context of any of the foregoing figures.

In some embodiments the payload mechanism 1300 comprises a shifter 1302 receiving a first input operand from an instruction; shifter 1302 is controlled by a shift controller 1303 via a second input; the shifter is coupled to an immediate operand register 1301 that may receive its first operand from the shifter 1302, and a second operand from its own first output as shown in FIG. 13. In some embodiments during operation, the immediate operand register 1301 and the shift controller 1303 initially hold a reset value such as 0. In such a case a first payload instruction is received whose first immediate operand value is received by the shifter 1302 as its first input and stored without a shift into immediate operand register 1301 via its first input. In a next/subsequent time cycle a second instruction with a second immediate operand value is received by the payload mechanism 1300 and presented as the first input to the shifter 1302. A shift value from an instruction decoder (not shown) is presented to the shift controller 1303 which checks it and updates the shift control value and presents it to the shifter 1302 via its second input. The shifter 1302 shifts the immediate operand received at its first input by a number of bits as specified by the shift control value and presents it to the immediate operand register 1301 via its first input. The immediate operand register 1301 receives its own stored output as its second input. The values from the first and second inputs to the immediate operand register are concatenated and the result value may be stored into the immediate operand register 1301, and may be made available at its first output to the second instruction for execution. This process may occur more than once if multiple payload instructions are used.

In some embodiments, the shifter 1302 may shift the first output of an immediate operand register loaded by one or more payload instructions, and the shifted value is concatenated to an immediate value from a subsequent instruction to produce an immediate result; the immediate result is then used by the subsequent instruction. If the subsequent instruction is also a payload instruction then the process continues further till completion (i.e. some termination condition is satisfied).

In some other embodiments, in the context of FIG. 12, after receiving a value of size n in a first payload instruction such as 1251, the shift control register for shifter may be set to n, and an immediate operand of length m in the adjacent succeeding MOVI such as 1252 may be presented as data input to the shifter. In some implementations, the shifted output may be loaded into bits m+n . . . n of the immediate operand register, thereby completing the concatenation. The MOVI instruction 1252 execution may be completed by moving the m+n bit long result value from the immediate operand register into a destination register with label RegisterX (FIG. 12). In some aspects, the immediate operand register and the shift control register may be cleared to 0, and the instruction may be retired. In some embodiments, there may be an overflow occurrence if the immediate operand register overflows and causes a fault.

In some embodiments, a machine configured to use a computer-implemented instruction set may comprise highly structured multi length instructions with lengths in exact multiples of 16-bits (i.e. 16 bits, 32 bits, 48 bits, 64 bits, and such) that may be designed for use in matrix, array, and vector processing along with general computing. This may also include graphics processing and neural network computations. In some aspects, the instructions may comprise a bit field that may determine instruction length that differentiates 16-bit length instructions from 32-bit instructions. In some implementations, a longer length instructions whose position may be invariant in all instructions may occur in the portion first decoded.

In some aspects, a field comprising bits may be designated and used as a major opcode whose position in all instructions may be invariant and may occur in the portion first decoded. In some implementations, a field may comprise bits used to modify the functionality of the major opcode and may partition an instruction set into a plurality of sub-sets, which may be customized, such as based on business limitation, simpler design, or combinations thereof, as non-limiting examples. In some aspects, the position may be invariant in all instructions and occurs in the portion first decoded.

In some aspects, a field comprising bits that identify instructions may be used by one or more built-in special function application and specific co-processor units, wherein the position may be invariant in all instructions and may occur in the portion first decoded. In some embodiments, a field comprising bits may be designated as a primary destination operand or a source operand whose position may be invariant in all instructions and may occur in the portion first decoded. In some implementations, various fields of bits may be designated for use as source operands, secondary destination operands, secondary or tertiary or miscellaneous opcodes, row or column or level designators, attributes, immediate values, memory pointers, miscellaneous operands, or miscellaneous opcodes to control instruction execution.

In some implementations, an embedded storage, such as a matrix space, may be configured to hold or store matrices (matrixes), single, double or multi-dimensional arrays such as matroids and vectors, wherein the embedded storage may comprise rows, columns of elements of binary values of any type either numeric or non-numeric. In some aspects, these elements may be singular or in plural and may be controlled or accessed by rows, columns, or both during transport and computation.

In some embodiments, a method and apparatus comprising a set of machine instructions (and their assembly language equivalent names) may be used to control, access, load, store, restore, set, transport, shift, manipulate, perform operations including logical, bit-manipulation and arithmetic and non-arithmetic operations. In order to execute steps of algorithms and or manipulations of the aforementioned vectors, there may exist arrays, matrices, or any of the contents held within the aforementioned matrix space along with contents of other registers or storage outside the matrix space on a plurality of stored elements parallelly, which may occur simultaneously, concurrently, or concomitantly. In some implementations, hardware, methods and instructions may control the state of a matrix space (including operations to reset, power on, power down, clock on, clock off, lock, secure, unlock, encrypt, decrypt or control in any manner to effect its state).

In some aspects, a set of one or more matrix pointer registers may be used to hold the location, size and operand type information of matrices or arrays stored in the matrix space. In some implementations, a method and apparatus may address and control matrices or arrays stored in the matrix space comprising of matrix pointer registers. In some embodiments, a matrix pointer register may hold a pair of row, column, or both addresses of the origin position of a matrix, which may be a pre-designated element-position in the matrix. In some aspects, the position may be a corner along with the size of the matrix given in terms of number of elements in its rows and number of elements in its columns (or in terms of numbers of rows and columns) of the matrix.

In some embodiments, defining its extent, a matrix pointer register may be used to control, store, and access one or more elements of a matrix or array by its rows, columns, or both. In some aspects, the control, storage, and access may occur in patterns within the matrix or arrays, such as its diagonals, sub-diagonals, a triangular sub-array, a tri-diagonal sub-array, a rectangular sub-array or a sub-array of a priori user-defined positions of the said matrix or array. In some implementations, there may be a plurality of machine instructions (and their assembly language equivalent) comprising the instruction set to control, access, load, store, restore, set, and compute using arithmetic, logical, and bit-manipulation operations.

In some embodiments, with the contents of these registers and the contents of the vectors, matrices, arrays inside, or those associated with the matrix space (including those held in system memory or other registers outside the matrix space), a type designation may identify the type of binary elements of a matrix.

As illustrative examples, the identifying may distinguish between bytes, short integers, integer words, long integers, pointers (to a memory location), half precision floating point numbers, single precision floating points, double precision floating points, extended and quad precision floating point numbers, ordered pairs (a collection of 2 values) of any integer types, ordered pairs of any floating point types, ordered quads (a collection of 4 values) of any integer types, ordered quads of any floating point types, triads of integer types, triads (a collection of 3 numbers) of floating point types, ordered quads or triads or pairs of nibbles or bytes, and other types comprising of values with no designated type that may comprise collections of a user-defined number of bits each.

In contrast to prior art that may identify a numeric value, the present invention may process complex strings comprising numbers, letters, segments, and combinations thereof. This may allow for separate processing of the different types, which may increase efficiency and allow for effective and efficient processing of complex strings with relatively low computing costs. In some aspects, various methods may interpret ordered pairs of values as complex numbers, quads, and triads of binary values as points, triangles or vectors in a geometric space or as elements of a tensor in computations using machine instructions. In some embodiments, various methods may be used to interpret these quads and triads of binary values as pixel intensities and colors, and as other possible groupings interpreted by instructions that act on them.

Some embodiments may comprise a plurality of instruction structures and modes. In some aspects, individual instructions for computing may comprise matrices and arrays or their parts comprising numeric or non-numeric binary values along with a plurality of binary values that may be elements of other matrices or their parts, vector registers or their parts, scalar register operands, memory operands, and immediate values of a variety of types.

In some aspects, methods and accompanying logic may be used to access one or more matrix (or matrices) or arrays in an embodiment of the matrix space for an operation, wherein the contents of one or more matrix pointer registers may be readable concurrently or simultaneously and each of which may be associated with a matrix or array in the matrix space. In some embodiments, a method may interpret the contents of the fields of a matrix pointer register as a pair of row and column and may address an origin or corner element of said matrix or array inside the matrix space. In some implementations, a method may identify the size in terms of a pair of numbers that may give the number of elements in the rows and columns of the said matrix or array.

In some aspects, a method may interpret the type field of the matrix pointer register, which may associate it with the type of elements of the said matrix or array. In some implementations, a set of method and apparatus may access, read, and control one or more elements of a matrix or array by row or by column or both, along with other operands like vector registers or scalar values or immediate operands from their locations of storage and may also perform computation and generate results. In some embodiments, a set of methods and apparatus may store the results of computation into a matrix held inside a matrix space via its ports into vector registers or scalar registers as the instruction may stipulate.

In some implementations, a method and apparatus may load one or more matrices or arrays from a memory, an embedded memory, or a processor cache into a matrix space that may use a load instruction. In some aspects, a set of methods and apparatus may store one or more matrices or arrays into a memory, an embedded memory, or a processor cache from a matrix space that may use a stored instruction.

Some aspects may comprise an access control mechanism and a set of attributes to secure a matrix space or portions of it to make them accessible and controllable by specific threads of specific processes of specific operating systems running on a computing machine. In some embodiments, these may be defined as a spatial division of the matrix space into one or more regions controlled by a set of instructions and logic to control the security and sharing attributes of these regions.

In some embodiments, one or more regions may comprise one or more partitions, and the access control mechanism may comprise encryption, decryption and security hardware and a plurality of registers that may hold binary valued keys to block or enable access to one or more regions by specified threads belonging to specified processes that may lease these secret or encrypted keys from an operating system or a virtual machine hypervisor.

In some implementations, the keys may comprise one or more fields, and a plurality of canonical key values like 0 and 1 (all 1s in a binary word) may designate complete blocking or full access to all threads or all processes. In some aspects, a plurality of fields in keys may allow an operating system to control a region of matrix space as stipulated by a virtual machine hypervisor. In some embodiments, methods and logic may be used to lock or unlock access to each matrix region in the aforementioned matrix space by a thread of a process making a request to an operating system using a privileged instruction under operating system control.

In some embodiments, a method and apparatus may comprise an immediate operand register that may be used in conjunction with a plurality of machine and assembly language instructions. In some aspects, a payload instruction may comprise an opcode and an immediate value operand that may be stored by a processing unit into an immediate operand register within it. In some implementations, a method and apparatus may decode the payload instruction with its immediate operand in a program sequence and pass the result for use with a preceding or succeeding instruction with or without an immediate operand for execution.

In some embodiments, a method and apparatus may comprise a shifter or a shift control register to hold a shift value and an immediate operand register that may be able hold a resultant immediate operand. In some aspects, a logic circuit may be present in an immediate operand from an instruction to the aforementioned shifter to perform a shift. In some implementations, it may concatenate it to the existing value in the immediate operand register. In some aspects, a logic circuit may compute a new shift value and place it into the shift control register prior to next instruction. In some aspects, a mechanism may reset the aforementioned registers, and a method and apparatus may use the resultant immediate operand in the immediate operand register as an immediate operand in the execution of an instruction.

The invention claimed is:

1. A computing system comprising:
a memory controlled by a memory controller;
a matrix space to store at least one array, the matrix space coupled to a control unit that comprises a logic circuit to configure and control matrix operations, wherein the matrix space is accessed by rows and/or by columns, and wherein the matrix space is separate from the memory, and wherein an individual element included in the at least one array is concurrently accessible by a row of the at least one array containing the individual element, and also by a column of the at least one array containing the individual element, independent of other elements;
at least one matrix instruction that references the at least one array in the matrix space; and
a matrix pointer register configured to store an origin of the at least one array in the matrix space, a size of the at least one array in the matrix space, and a type of the at least one array in the matrix space, wherein the at least one matrix instruction comprises an operand that is an index of the matrix pointer register, and wherein the type of the at least one array identifies a type of elements in the at least one array in the matrix space, wherein the type is one of: pointer to a memory location, half precision floating point number, single precision floating point number, double precision floating point number, string, ordered quad of integers, ordered quad of floating point numbers, ordered triad of integers, ordered triad of floating point numbers, ordered pairs of integers, ordered pairs of floating point numbers, ordered quad of bytes, ordered quad of nibbles, ordered triad of bytes, ordered triad of nibbles, ordered pairs of bytes, and ordered pairs of nibbles, and wherein the at least one matrix instruction is configured to operate on string elements of the at least one array when the type is string.

2. The computing system of claim 1, wherein the at least one array is configured in the matrix space on a semiconductor chip having at least one matrix pointer register.

3. The computing system of claim 1, further comprising:
one or more load matrix instructions; and
one or more store matrix instructions.

4. The computing system of claim 1, further comprising at least one vector instruction configured to operate upon at least one vector entity, wherein the at least one vector entity comprises at least one of, scalars, or packed and ordered groups of values, or strings.

5. The computing system of claim 1, wherein the origin of the at least one array comprises a row number and a column number.

6. The computing system of claim 1, wherein the size of the at least one array is defined by a first number of rows in the at least one array, and a second number of columns in the at least one array.

7. The computing system of claim 1, wherein the at least one matrix instruction is configured to access the row of the at least one array or the column of the at least one array or a diagonal of the at least one array.

8. The computing system of claim 1, wherein the at least one matrix instruction is configured to transpose the at least one array.

9. The computing system of claim 1, wherein the at least one matrix instruction is configured to count elements of the row of the at least one array, reorder the elements of the row of the at least one array, or sum the elements of the row of the at least one array.

10. The computing system of claim 1, wherein the at least one matrix instruction is configured to count elements of the column of the at least one array, reorder the elements of the column of the at least one array, or sum the elements of the column of the at least one array.

11. The computing system of claim 1, wherein the at least one matrix instruction is configured to read one or more diagonals of the at least one array in the matrix space, wherein all elements of the one or more diagonals are accessed simultaneously.

12. The computing system of claim 1 further comprising:

at least one row port, coupled to the matrix space, that is configured to access the row of the at least one array in the matrix space; and at least one column port, coupled to the matrix space, that is configured to access the column of the at least one array in the matrix space, wherein the at least one row port comprises a first circuit and the at least one column port comprises a second circuit, and wherein the row of the at least one array and the column of the at least one array are oriented perpendicularly.

13. The computing system of claim 12 further comprising at least one execution unit coupled to the matrix space via the at least one row port or via the at least one column port, wherein the at least one execution unit is configured to use at least a portion of the at least one array in a computation.

14. The computing system of claim 12, wherein the at least one matrix instruction is configured to simultaneously access at least a portion of the row of the at least one array at the at least one row port and at least a portion of the column of the at least one array at the at least one column port.

\* \* \* \* \*